(12) United States Patent
Galor Gluskin et al.

(10) Patent No.: US 11,977,319 B2
(45) Date of Patent: May 7, 2024

(54) SALIENCY BASED CAPTURE OR IMAGE PROCESSING

(71) Applicant: QUALCOMM Incorporated, San Diego, CA (US)

(72) Inventors: Micha Galor Gluskin, San Diego, CA (US); Ying Noyes, San Diego, CA (US); Wenbin Wang, San Diego, CA (US); Lee-Kang Liu, San Diego, CA (US); Balakrishna Mandadi, Hyderabad (IN); Yiqian Wang, San Diego, CA (US); Nan Cui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/480,970

(22) Filed: Sep. 21, 2021

(65) Prior Publication Data

US 2022/0100054 A1     Mar. 31, 2022

Related U.S. Application Data

(60) Provisional application No. 63/083,579, filed on Sep. 25, 2020.

(51) Int. Cl.
*G03B 13/36* (2021.01)
*G03B 3/10* (2021.01)
(Continued)

(52) U.S. Cl.
CPC .............. *G03B 13/36* (2013.01); *G03B 3/10* (2013.01); *H04N 23/55* (2023.01); *H04N 23/632* (2023.01); *H04N 23/73* (2023.01)

(58) Field of Classification Search
CPC ........ G03B 13/36; G03B 3/10; H04N 5/2254; H04N 5/232935; H04N 5/2353;
(Continued)

(56) References Cited

U.S. PATENT DOCUMENTS 8,326,026 B2 * 12/2012 Le Meur .............. G06V 10/451
                                                   382/162
9,092,700 B2    7/2015 Wang et al.
(Continued)

OTHER PUBLICATIONS

International Search Report and Written Opinion—PCT/US2021/051496—ISA/EPO—dated Jan. 5, 2022 (18 pp).
(Continued)

*Primary Examiner* — Padma Haliyur
(74) *Attorney, Agent, or Firm* — QUALCOMM Incorporated

(57) ABSTRACT

A device for image capture comprises a memory and one or more processors coupled to the memory and configured to: receive, during a preview mode or a recording, a first image, generate a first saliency map indicative of relative saliency of different regions within the first image, wherein the relative saliency of the different regions is indicative of a likelihood of attracting viewer gaze, generate one or more additional images based on manipulating pixels in the first image, generate one or more additional saliency maps indicative of relative saliency of different regions within the one or more additional images, and determine, during the preview mode or the recording, a camera setting based on the first saliency map and the one or more additional saliency maps.

28 Claims, 12 Drawing Sheets

(51) Int. Cl.
*H04N 23/55* (2023.01)
*H04N 23/63* (2023.01)
*H04N 23/73* (2023.01)

(58) Field of Classification Search
CPC ......... H04N 5/232122; H04N 5/23299; H04N 5/235; H04N 5/23212; H04N 5/23218; H04N 5/23229; H04N 9/735; G06T 7/11; G06T 7/194
See application file for complete search history.

(56) References Cited

U.S. PATENT DOCUMENTS

| | | | |
|---|---|---|---|
| 9,699,371 B1 | 7/2017 | Eslami | |
| 9,727,798 B2* | 8/2017 | Caldwell | G06V 10/462 |
| 2015/0117783 A1* | 4/2015 | Lin | G06T 11/60 |
| | | | 382/195 |
| 2015/0154466 A1* | 6/2015 | Lin | G06V 10/462 |
| | | | 382/203 |
| 2016/0291690 A1* | 10/2016 | Thorn | H04N 5/23216 |
| 2017/0289434 A1* | 10/2017 | Eslami | G06T 7/215 |
| 2019/0132520 A1* | 5/2019 | Gupta | H04N 23/632 |
| 2019/0244327 A1 | 8/2019 | Lin et al. | |
| 2019/0244360 A1* | 8/2019 | Oniki | H04N 23/60 |
| 2020/0380289 A1* | 12/2020 | Jagadeesh | G06K 9/6256 |
| 2021/0004962 A1 | 1/2021 | Tsai et al. | |
| 2022/0101035 A1* | 3/2022 | Barkan | G06V 10/764 |

OTHER PUBLICATIONS

I N., et al., "Saliency Detection on Light Field", IEEE Transactions on Pattern Analysis and Machine Intelligence, IEEE Computer Society, USA, vol. 39, No. 8, Aug. 1, 2017 (Aug. 1, 2017), pp. 1605-1616, XP011655104, ISSN: 0162-8828, DOI:10.1109/TPAMI. 2016.2610425[retrieved on Jun. 29, 2017]abstract section 3, Computing Light Field Saliency Cues ,section 4, Saliency Detection equation 9, figures 2, 3.

Wang X., et al., "Multi-Exposure Decomposition-Fusion Model for High Dynamic Range Image Saliency Detection", IEEE Transactions on Circuits and Systems for Video Technology, IEEE, USA, vol. 30, No. 12, Apr. 3, 2020 (Apr. 3, 2020), pp. 4409-4420, XP011825067, ISSN: 1051-8215, DOI:10.1109/TCSVT.2020. 2985427, [retrieved on Dec. 3, 2020], abstract, section III, Proposed Method, figure 2.

Zeeshan M., et al., "A Newly Developed Ground Truth Dataset for Visual Saliency in Videos", Special Section on Survivability Strategies for Emerging Wireless Networks, IEEE, vol. 6, Apr. 13, 2018, pp. 20855-20867.

* cited by examiner

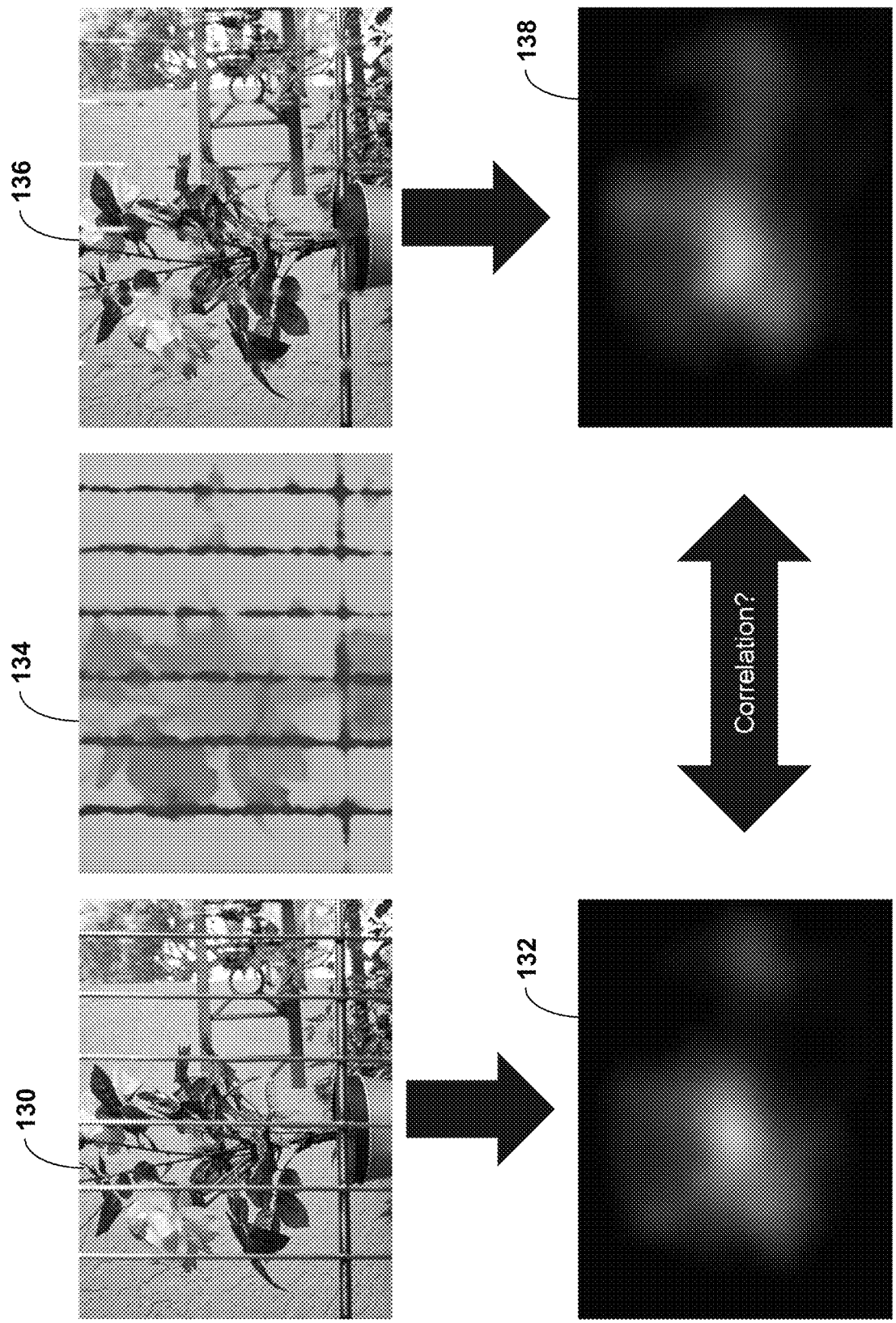

SALIENCY BASED CAPTURE OR IMAGE PROCESSING

This application claims the benefit of U.S. Provisional Application No. 63/083,579, filed Sep. 25, 2020, the entire contents of which are incorporated by reference herein.

TECHNICAL FIELD

The disclosure relates to capture or image processing.

BACKGROUND

A camera device includes one or more cameras that capture frames (e.g., images). Examples of the camera device include stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, gaming devices, computer devices that include cameras, such as so-called "web-cams," or any device with digital imaging or video capabilities.

A camera device processes the captured frames and outputs the frames for display. In some examples, the camera device controls the exposure, focus, and white balance to capture high quality images.

SUMMARY

In general, this disclosure describes techniques for saliency-based capture or image processing. Saliency may refer to a viewer's focal points in an image, such as elements that stand out and attract a viewer's attention. A saliency map may be indicative of relative saliency of different regions within the image in attracting viewer gaze.

As described in more detail, one or more processors may be configured to generate a first saliency map for a first image, and generate one or more saliency maps for each of one or more additional images. The one or more additional images may be based on manipulating pixels in the first image. The one or more processors may determine a camera setting (e.g., autofocus setting, autoexposure setting, etc.) based on the first saliency map and the one or more additional saliency maps.

For instance, the device may compare the first saliency map and the one or more additional saliency maps to determine the camera setting for a camera. In some examples, the salient regions may be at different depths. By comparing the first saliency map and the one or more additional saliency maps, the device may confirm the depth of the salient region, and determine the camera setting based on the correct depth. Stated another way, the device may determine a most salient depth based on the first saliency map and the one or more additional saliency maps, and determine the camera setting based on the determined most salient depth.

In one example, the disclosure describes a device for image capture, the device comprising a memory; and one or more processors coupled to the memory and configured to: receive, during a preview mode or a recording, a first image; generate a first saliency map indicative of relative saliency of different regions within the first image, wherein the relative saliency of the different regions is indicative of a likelihood of attracting viewer gaze; generate one or more additional images based on manipulating pixels in the first image; generate one or more additional saliency maps indicative of relative saliency of different regions within the one or more additional images; and determine, during the preview mode or the recording, a camera setting based on the first saliency map and the one or more additional saliency maps.

In one example, the disclosure describes a method for image capture, the method comprising: receiving, during a preview mode or a recording, a first image; generating a first saliency map indicative of relative saliency of different regions within the first image, wherein the relative saliency of the different regions is indicative of a likelihood of attracting viewer gaze; generating one or more additional images based on manipulating pixels in the first image; generating one or more additional saliency maps indicative of relative saliency of different regions within the one or more additional images; and determining, during the preview mode or the recording, a camera setting based on the first saliency map and the one or more additional saliency maps.

In one example, the disclosure describes a computer-readable storage medium storing instructions thereon that when executed cause one or more processors to: receive, during a preview mode or a recording, a first image; generate a first saliency map indicative of relative saliency of different regions within the first image, wherein the relative saliency of the different regions is indicative of a likelihood of attracting viewer gaze; generate one or more additional images based on manipulating pixels in the first image; generate one or more additional saliency maps indicative of relative saliency of different regions within the one or more additional images; and determine, during the preview mode or the recording, a camera setting based on the first saliency map and the one or more additional saliency maps.

In one example, the disclosure describes a device for image capture, the device comprising: means for receiving, during a preview mode or a recording, a first image; means for generating a first saliency map indicative of relative saliency of different regions within the first image, wherein the relative saliency of the different regions is indicative of a likelihood of attracting viewer gaze; means for generating one or more additional images based on manipulating pixels in the first image; means for generating one or more additional saliency maps indicative of relative saliency of different regions within the one or more additional images; and means for determining, during the preview mode or the recording, a camera setting based on the first saliency map and the one or more additional saliency maps.

The details of one or more examples are set forth in the accompanying drawings and the description below. Other features, objects, and advantages will be apparent from the description, drawings, and claims.

BRIEF DESCRIPTION OF DRAWINGS

FIG. 11 is a flow diagram illustrating an example of utilizing multiple saliency maps for autofocus.

DETAILED DESCRIPTION

Figure 1:
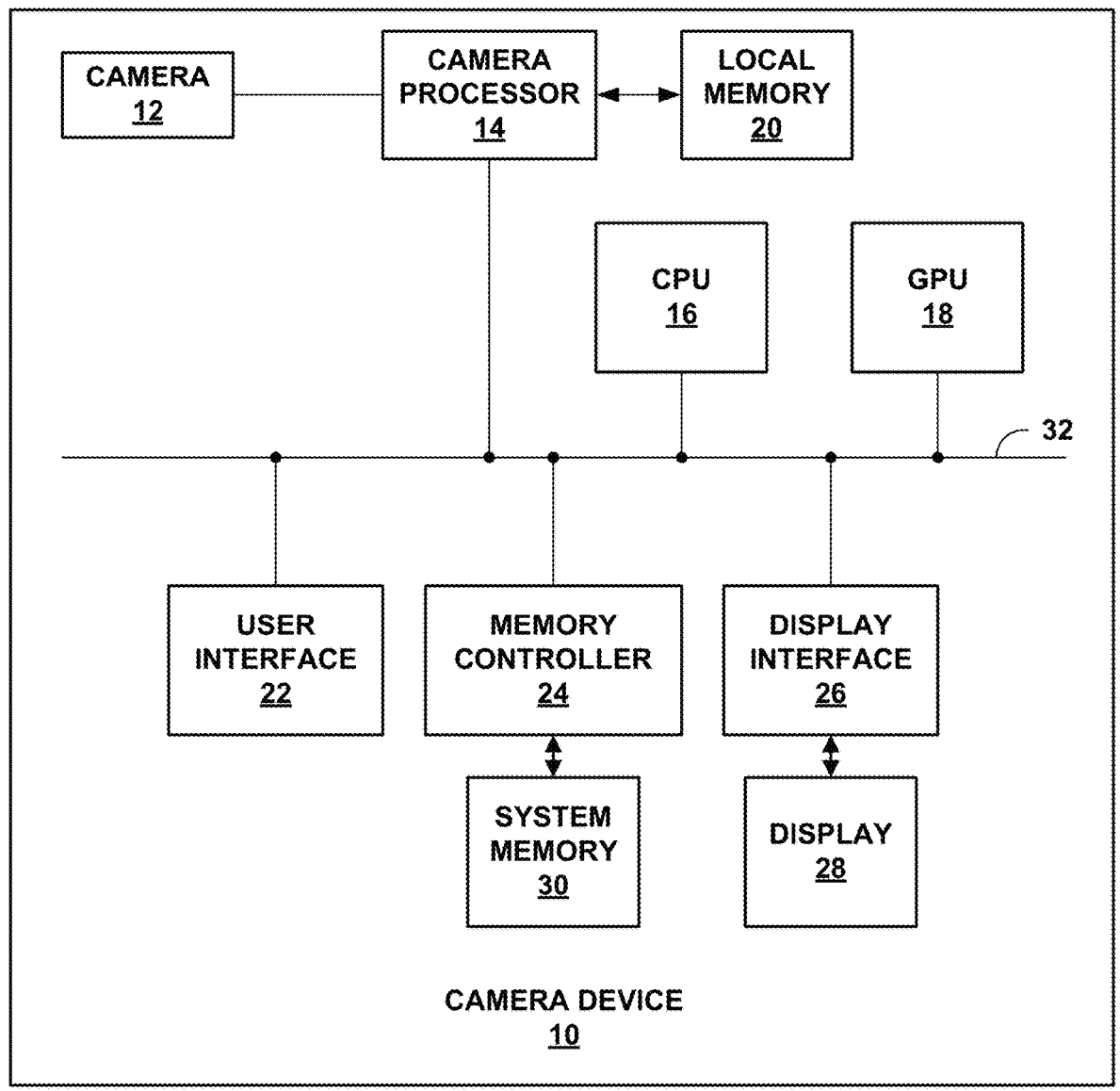
FIG. 1 is a block diagram of a device configured to perform one or more of the example techniques described in this disclosure.

The example techniques described in this disclosure relate to generating (e.g., during a preview mode or recording), a saliency map indicative of relative saliency of different regions within an image in attracting viewer gaze. For example, the saliency map may be indicative of probabilities that the different regions within an image attract viewer gaze and are therefore salient. That is, the saliency map may be indicative of relative saliency of different regions within the image, and the relative saliency of the different regions may be indicative of a likelihood of attracting viewer gaze.

A camera device may then utilize the saliency map to control a camera, such as the focus or exposure, of the camera. In general, the camera device may utilize the saliency map to process the image (e.g., capture process or image process), where examples of processing the image include controlling focus, exposure, and white balance. As one example, for image capture processing, the camera device may adjust an auto-white balance, an autofocus, or an autoexposure to capture the image. As another example, for image processing, the camera device may determine a quantization level for encoding the image, a zoom or crop portion of the image, or increase an amount of processing performed on regions having relatively higher saliency as compared to other regions.

As noted above, the saliency map may be indicative of relative saliency of different regions within an image in attracting viewer gaze. By processing the image based on the saliency map, the example techniques describe ways in which to generate images that are more visually pleasing as compared to image capture or image processing techniques that do not rely on a saliency map.

For instance, the camera device may control the autofocus so as to focus more on salient regions (e.g., regions having higher probability of attracting viewer gaze) compared to non-salient regions, resulting in a captured image with more clarity and sharpness in the salient regions. With autoexposure, the camera device may determine which area of the image content is to be exposed (e.g., using a metering map). In some examples, the camera device may modify exposure to ensure that the salient region is properly exposed. In some examples, the metering may generally be biased towards the center of the image, although other types of metering are possible. For example, a metering map may identify which portions are to be exposed, and may indicate that an exposure for a middle area of the image is exposed more than other areas, although other types of metering maps are possible. With the example techniques described in this disclosure, it may be possible to scale the metering map so that exposure is kept constant through the salient regions based on the saliency map. There may be additional example ways in which the saliency map is used to process the image.

In some examples, the saliency map may be relatively accurate in correctly identifying the salient regions in an image where a camera should focus. However, there may be salient regions at different depths (e.g., there may be multiple salient regions having different objects at different depths). To ensure that the camera settings should be adjusted to focus on objects at the appropriate depth, the camera device may generate one or more additional images. For instance, the image may be considered as a first image, and the camera device may generate the one or more additional images based on the first image, such as by manipulating pixels in the first image.

The camera device may determine one or more additional saliency maps in the one or more additional images. As described in more detail, in one or more examples, the camera device may determine depth of different image content, and may determine image content that contributes the saliency as a way to determine the autofocus setting. For instance, there may be a first object, represented as first image content, at a first depth, and a second object, represented as second image content, at a second depth. This disclosure describes example ways in which to confirm where the autofocus should be using saliency map of the first image and the one or more additional saliency maps.

For instance, as described in more detail below, if the one or more additional saliency maps are substantially the same as the first saliency map for the first image, the camera device may confirm that the autofocus should be based on the determined salient regions of the first image. However, if the one or more additional saliency maps are not substantially the same as the first saliency map, the camera device may determine that the autofocus should be determined based on the objects in foreground of the first image. In this way, the autofocus operation of the camera device may be improved by ensuring that the focus is not on regions that are not salient.

One example way to determine whether the first saliency map is substantially the same or not substantially the same as the one or more additional saliency maps may be based on determining a difference between the first saliency map and one or more additional saliency maps, and determining that the difference is less than a threshold or greater than a threshold. As described above, the one or more additional images may be generated based on manipulating pixels in the first image. One example way of manipulating pixels in the first image is to determine pixels of objects in the first image (e.g., such as based on phase detection autofocus (PDAF) techniques that determine relative distances of pixels) and manipulate the pixels for objects in the foreground (e.g., such as by inpainting the pixels for objects in the foreground). In inpainting, the pixels to be inpainted are removed, and replaced by blending (e.g., averaging red, blue, and green values) of pixels neighboring the pixels of object in the foreground.

The above example describes autofocus setting as an example of a camera setting. Another example of the camera setting may be the autoexposure setting. In some examples, the camera device may generate the one or more additional images by simulating different exposures on the first image, such as by changing tone of the first image. The camera device may generate the one or more additional saliency maps within the one or more additional images that are generated by the simulating.

The camera device may generate a metering map based on the first saliency map and the one or more additional saliency maps. For example, the camera device may generate a plurality of metering maps, one metering map for each of the images (e.g., first image and the one or more additional images) based on respective saliency maps. The camera device may average (as one example) the metering maps to generate an updated metering map. The camera device may determine the autoexposure setting based on the updated metering map (i.e., the metering map generated from the averaging of the plurality of metering maps).

For ease of explanation, the example techniques are described with respect to auto-white balance, autoexposure, and autofocus for image capture, and quantizing, zooming/cropping, and processing amounts for image processing. However, the example techniques should not be considered limited to these examples. The example techniques may be utilized for other capture or image processing.

In one or more examples, because the camera device uses the saliency map to process the image for image capture, the camera device may be configured to determine the saliency map in real-time or live (i.e., in the process of capturing the image, as a still image or as a video recording). Real-time or live may refer to substantially instantaneous (e.g., within less than milliseconds). For example, the camera device may execute an application to capture an image or for recording, it is during the run-time of the application that the camera device may generate the saliency map. As an example, the camera device may generate the saliency map in a preview mode (e.g., prior to image capture) and then utilize the saliency map for processing the image (e.g., adjust autoexposure, autofocus, auto-white balance parameters and/or quantize, zoom/crop, and determine processing amounts for image processing based on the saliency map). In some examples but not in all examples, changing exposure or focus (e.g., by moving the location of a lens of the camera) may be performed only where the saliency map is generated in preview mode.

Although possible, in one or more examples, rather than utilizing post-processing techniques (e.g., techniques that apply to the captured image) to correct the white balance, focus, or exposure, the example techniques utilize the saliency map at the time of capture (e.g., in real-time). Post-processing techniques to correct the white balance, focus, or exposure tend to be limited in the amount of correction that is possible. Additionally, in some examples, post-processing techniques potentially can create other artifacts in the image. With the real-time generation of the saliency map and real-time utilization of the saliency map for processing the image (e.g., as part of capture), the example techniques may provide for better image processing as compared to post-processing techniques.

Due to the real-time generation of the saliency maps, the camera device may be configured to generate the saliency maps and process the image using the saliency maps relatively quickly (e.g., in the order of milliseconds, such as less than 20 ms). However, regions that are salient are extremely variable. For example, a single house in the forest will be salient in one scene, while a single tree will be salient on the background of an urban neighborhood.

This disclosure describes example techniques where the camera device may implement a neural network (NN) to determine the saliency maps. In one or more examples, the weights utilized by the neutral network may be generated based on machine-learning techniques.

As an example, one or more viewers may be presented with hundreds or thousands of different training images. The viewers may wear goggles with eye-tracking circuitry, or the eye-tracking circuitry may be coupled to a device (e.g., monitor) on which the viewer is viewing the training images. The eye-tracking circuitry may determine where the locations of the viewers' gaze on each training image, and store information indicative of the locations. In some examples, rather than or in addition to using eye-tracking circuitry, the viewers may manually identify regions that attracted the gaze of the viewers. However, using eye-tracking circuitry allows determination of locations that attracted the gaze of the viewers much faster than manual entry.

The information indicative of the locations may be "ground truths" (i.e., verified locations that attract the gaze of the viewer). Utilizing the "ground truths," one or more processors (e.g., located on one or more servers in a cloud network) may generate weights for a neural network, such that when sample values of an input image are multiplied by the weights, the output is the saliency map. The weights may be considered as the trained model, where the trained model is generated by training an untrained model with the "ground truths."

The one or more processors may test the accuracy of the weights by inputting images used to generate the "ground truths" and determine whether the saliency map that the neural network outputs is approximately equal to the locations that attracted the gaze of the viewers as determined by eye-tracking circuitry or based on manual identification by the viewers. For example, the one or more processors may receive the training images and the ground truths, and generalize (e.g., learn) what types of image content attracts viewer gaze. The result of the learning may be weights that are multiplied to sample values of an image to generate the saliency map for that image.

The one or more processors in the one or more servers in the cloud network may output the weights to the camera device. In some examples, it may be possible to utilize the camera device itself to generate the weights. The neural network of the camera device may then utilize the weights and processes an image (e.g., an image that is to be captured, such as in preview mode, or is being captured, such as in recording) based on the weights to generate the saliency map in real-time (e.g., run-time of the application used for image capture) for processing the image.

The saliency map described in this disclosure should not be confused with object detection (e.g., face detection, pet detection, etc.) algorithms. Object detection algorithms identify a particular object. Although possible, saliency maps may not necessarily identify a particular object. Rather, the saliency maps provide information of likelihood of attracting viewer gaze. For instance, the saliency map may indicate that a particular location is salient (e.g., there is a high likelihood that a viewer's gaze is attracted to the particular location), but may not provide additional information as to the object that is attracting the viewer's gaze. It may be possible that the particular location with high probability (i.e., likelihood) of attracting viewer gaze happens to be a face or pet, etc., but the saliency map may not indicate the type of object. Object detection, on the other hand, may indicate the location or existence of a particular type of object, but may not provide information of saliency, such as probability of attracting a viewer's gaze. It may be possible, that by chance, a viewer is naturally attracted to the detected object, but the object detection may not indicate the probability of attracting a viewer's gaze.

Moreover, the saliency map may indicate that a region is salient based on the image composition (e.g., what it is that is being displayed) and not how interesting an object is. For example, there may be perspective vanishing points that are salient in an image. As another example, openings in building or tunnel entrance may be salient. As another example, an image showing a person pointing with their hand may be salient because the viewer will tend to follow the pointed line/direction.

The example techniques utilizing the saliency map may operate together with other functions of the camera device for autofocus, autoexposure, and auto-white balance control. For example, some camera devices may be configured to identify objects in foreground instead of background and focus on foreground objects. In some examples, the camera device may first determine the salient regions in an image, and then control the focus on the salient regions that are also in the foreground. The order of processing by determining salient regions first, and then adjusting focus on objects in salient regions in the foreground, is one example. As another example, the camera devices may identify objects in the foreground, and then utilize the saliency map to further control the focus with the identified objects.

FIG. 1 is a block diagram of a device configured to perform one or more of the example techniques described in this disclosure. Examples of camera device 10 include stand-alone digital cameras or digital video camcorders, camera-equipped wireless communication device handsets, such as mobile telephones having one or more cameras, cellular or satellite radio telephones, camera-equipped personal digital assistants (PDAs), computing panels or tablets, gaming devices, computer devices that include cameras, such as so-called "web-cams," or any device with digital imaging or video capabilities.

As illustrated in the example of FIG. 1, camera device 10 includes camera 12 (e.g., having an image sensor and lens), camera processor 14 and local memory 20 of camera processor 14, a central processing unit (CPU) 16, a graphical processing unit (GPU) 18, user interface 22, memory controller 24 that provides access to system memory 30, and display interface 26 that outputs signals that cause graphical data to be displayed on display 28. Although the example of FIG. 1 illustrates camera device 10 including one camera 12, in some examples, camera device 10 may include a plurality of cameras, such as for omnidirectional image or video capture.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Additional examples of components that may be configured to perform the example techniques include a digital signal processor (DSP), a vector processor, or other hardware blocks used for neural network (NN) computations. Various other permutations and combinations are possible, and the techniques should not be considered limited to the example illustrated in FIG. 1.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 and system memory 30 include one or more volatile or non-volatile memories or storage devices, such as random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. The specific configuration of buses and communication interfaces between the different components shown in FIG. 1 is merely exemplary, and other configurations of camera devices and/or other image processing systems with the same or different components may be used to implement the techniques of this disclosure.

Camera processor 14 is configured to receive image frames from camera 12, and process the image frames to generate output frames for display. CPU 16, GPU 18, camera processor 14, or some other circuitry may be configured to process the output frame that includes image content generated by camera processor 14 into images for display on display 28. In some examples, GPU 18 may be further configured to render graphics content on display 28.

In some examples, camera processor 14 may be configured as an image processing pipeline. For instance, camera processor 14 may include a camera interface that interfaces between camera 12 and camera processor 14. Camera processor 14 may include additional circuitry to process the image content. Camera processor 14 outputs the resulting frames with image content (e.g., pixel values for each of the image pixels) to system memory 30 via memory controller 24.

CPU 16 may comprise a general-purpose or a special-purpose processor that controls operation of camera device 10. A user may provide input to camera device 10 to cause CPU 16 to execute one or more software applications. The software applications that execute on CPU 16 may include, for example, a media player application, a video game application, a graphical user interface application or another program. The user may provide input to camera device 10 via one or more input devices (not shown) such as a keyboard, a mouse, a microphone, a touch pad or another input device that is coupled to camera device 10 via user interface 22.

One example of the software application is a camera application. CPU 16 executes the camera application, and in response, the camera application causes CPU 16 to generate content that display 28 outputs. GPU 18 may be configured to process the content generated by CPU 16 for rendering on display 28. For instance, display 28 may output information such as light intensity, whether flash is enabled, and other such information. The user of camera device 10 may interface with display 28 to configure the manner in which the images are generated (e.g., with or without flash, focus settings, exposure settings, and other parameters).

As one example, after executing the camera application, camera device 10 may be considered to be in preview mode. In preview mode, camera 12 outputs image content to camera processor 14 that performs camera processing and outputs image content to system memory 30 that display interface 26 retrieves and outputs on display 28. In preview mode, the user, via display 28, can view the image content that will be captured when the user engages a button (real or on display) to take a picture. As another example, rather than taking a still image (e.g., picture), the user may record video content (e.g., a series of images). During the recording, the user may be able to view the image content being captured on display 28.

During preview mode or recording, camera device 10 (e.g., via CPU 16) may control the way in which camera 12 captures images (e.g., before capture or storing of image). This disclosure describes the examples techniques as being performed by CPU 16. However, the example techniques should not be considered limited to CPU 16 performing the example techniques. For instance, CPU 16 in combination with camera processor 14. GPU 18, a DSP, a vector processor, and/or display interface 26 may be configured to perform the example techniques described in this disclosure. For example, a processor may be configured to perform the example techniques described in this disclosure. Examples of the processor include camera processor 14, CPU 16, GPU 18, display interface 26, a DSP, a vector processor, or any combination of one or more of camera processor 14, CPU 16, GPU 18, display interface 26, the DSP, or the vector processor.

CPU 16 may be configured to control the camera setting of camera 12 (e.g., exposure and/or focus) to capture visually pleasing images. For example, CPU 16 may be configured to generate signals that control the exposure, focus, and white balance settings, as a few non-limiting examples, of camera 12. Controlling the exposure setting is referred to as determining autoexposure setting, controlling the focus setting is referred to as determining autofocus setting, and controlling the white balance is referred to as determining auto-white balance setting. CPU 16 may be configured to control the exposure, focus, and white balance settings based on the images received from camera processor 14 during preview mode or recording. In this way, for still images, when the user engages to take the picture, the exposure, focus, and white balance are adjusted (e.g., the parameters for exposure, focus, and possibly white balance settings are determined before image capture so that the exposure, focus, and white balance can be corrected during the image capture). For recording, the exposure, focus, and white balance may be updated regularly during the recording.

For the autoexposure setting, CPU 16 may determine the aperture, shutter speed, and analog gain of camera 12 based on factors such as external lighting conditions. As one example, camera processor 14 may determine information indicative of light, and adjust the aperture, shutter speed, and analog gain accordingly to keep exposure of the image constant. For example, if there is too much light (i.e., overexposed), then details in the images may be lost, and if there is too little light (i.e., underexposed), then the image may be too dark and details may not be visible. There are various ways in which exposure is controlled, using "metering" such as center-weighted metering map where exposure at the center of the image is kept higher and progressively lowered near the edges of the image. The techniques described in this disclosure are not limited to examples of center-weighted metering maps (e.g., not limited to metering maps that are biased toward exposure control for a middle of the image).

For the autofocus setting. CPU 16 may determine an area on which to focus so that the image content in the focused areas appear sharper than other areas. As one example, CPU 16 may utilize phase detection autofocus (PDAF) techniques described below. CPU 16 may then control camera 12 (e.g., location of the lens of camera 12) based on area to focus. In some examples, CPU 16 may determine objects that are in the foreground and may control camera 12 to focus on the foreground objects. As another example, CPU 16 may utilize object detection techniques, like face detection, to determine area to focus.

For auto-white balance, CPU 16 may determine "color temperature" of light source, where color temperature refers to the relative warmth or coolness of the white color. In some cases, captured images may have an unrealistic color cast. CPU 16 may determine the color temperature to control the way in which to capture the image. For example, CPU 16 may determine the brightest part of the image, based on brightness information provided by camera processor 14, as the white color.

In some examples, auto-white balance algorithm analyzes the ratio between red, green and blue component and applies heuristics that result of the suggested Red and Blue gain levels. When the R, B channels are multiplied by those multipliers, the image will look more balanced: gray regions will look gray and will not have unnatural color cast. However, in case of multi-illumination scenes (e.g., where there is shadows), determining the multipliers may be more challenging since different multipliers are ideal for different regions.

The above describes some example techniques for capture processing (e.g., autoexposure, autofocus, and auto-white balance). In one or more examples described in this disclosure, CPU 16 may be configured to determine the autoexposure, autofocus, and auto-white balance settings based on a saliency map. The saliency map may be indicative of relative saliency of different regions within the image in attracting viewer gaze. For example, the saliency map may be indicative of relative saliency of different regions within the image, and the relative saliency of the different regions may be indicative of a likelihood of attracting viewer gaze.

As one example, the saliency map may be indicative of probabilities (e.g., likelihood) that the different regions within an image attract viewer gaze. As another example, the saliency map may include binary values that indicate whether a region is salient or not salient. Because adjusting the exposure, focus, and/or white balance is performed in real-time or live (e.g., substantially instantaneously with the image being captured), CPU 16 may be configured to generate, during the preview mode or the recording, a saliency map indicative of relative saliency of different regions within the image in attracting viewer gaze.

In one or more examples, CPU 16 may utilize artificial intelligence (AI) techniques, such as machine learning techniques. For instance, in machine learning, there may be one or more machine-learning models (e.g., trained models) that define weights. CPU 16 may utilize the weights to process sample values of samples (e.g., pixels) in the image (e.g., in preview mode or as part of the recording), and the result of the processing may be the saliency map. For example, CPU 16 may multiply weights, stored in memory (e.g., system memory 30), generated by one or more machine-learning models with sample values of the image to identify areas in the image having higher probabilities of attracting viewer gaze differently than areas in the image having lower probabilities of attracting viewer gaze.

For instance, the saliency map may be a plurality of samples, where each sample is assigned a value (e.g., between 0 and 255). A low value (e.g., closer to 0) may mean that the region in the image that corresponds to the sample having a low value is not salient (e.g., low probability of attracting viewer gaze). A high value (e.g., closer to 255) may mean that the region in the image that corresponds to the sample having a high value is salient (e.g., high probability of attracting viewer gaze). Accordingly, areas in the image having higher probability of attracting viewer gaze may be identified differently than areas in the image having lower probability of attracting viewer gaze. For example, the saliency map has higher values corresponding to areas in the image having higher probability of attracting viewer gaze and the saliency map has lower value corresponding to areas in the image having lower probability of attracting viewer gaze.

As another example, the saliency map may be a plurality of samples, where each sample is assigned a binary value (e.g., 1 or 0). If a sample is assigned a value of 0, then the sample corresponds to a region of the image that is not salient (e.g., low probability of attracting viewer gaze). If a sample is assigned a value of 1, then the sample corresponds to a region of the image that is salient (e.g., high probability of attracting viewer gaze). There may be other examples of the saliency map. In one or more examples, the saliency map may identify areas in the image having higher probabilities of attracting viewer gaze differently than areas in the image having lower probabilities of attracting viewer gaze (e.g., binary value or values within a range such as 0 to 255).

There may be various ways in which CPU 16 may determine the weights for the machine-learning models. As one example, the weights may be pre-generated and uploaded into system memory 30. CPU 16 may determine the weights from the weights stored in system memory 30. For instance, one or more viewers may be given a plurality (e.g., hundreds or thousands) of training images to view. The viewers may wear eye tracking goggles or the eye tracking circuitry may be coupled to a device (e.g., monitor) on which the viewers view the images that determine information of where viewers are looking, and may tag the images with regions where the viewers were looking. The tags may be saliency points. One or more processors (e.g., in one or more servers in a cloud system) may utilize these saliency points in the tagged images as "ground-truths" to determine weights (e.g., to generate a trained model defining the weights) that when utilized to process the sample values of the training images generate a saliency map.

In one or more examples, CPU 16 may utilize the saliency map to one or more of adjust a white balance of device 10 (e.g., camera 12) configured to capture the image, adjust a focus of device 10 (e.g., camera 12) configured to capture the image, or adjust an exposure of device 10 (e.g., camera 12) configured to capture the image. As one example, CPU 16 may determine the autoexposure, autofocus, and/or auto-white balance, and then CPU 16 may update the autoexposure, autofocus, and/or auto-white balance based on the saliency map. As another example, rather than first determining the autoexposure, autofocus, and/or auto-white balance and then updating, CPU 16 may be configured to integrate the saliency map as part of the determination of the autoexposure, autofocus, and/or auto-white balance settings. In each of these examples, CPU 16 may be considered as adjusting a white balance of device 10 (e.g., camera 12) configured to capture the image, adjusting a focus of device 10 (e.g., camera 12) configured to capture the image, or adjusting an exposure of device 10 (e.g., camera 12) configured to capture the image.

As one example, for autoexposure. CPU 16 may be configured to generate the metering map based on the saliency map, where the metering map indicates which areas of the image are to be exposed. As one example, CPU 16 may retrieve a metering map, and may scale the metering map based on the saliency map to generate an updated metering map. CPU 16 may adjust the exposure based on the updated metering map. In some examples, it may be possible to utilize the saliency map itself as the metering map. However, in the event that the saliency map is imperfect (e.g., areas determined to have high saliency are not areas with high saliency), there may be benefits for CPU 16 to scale a metering map for autoexposure based on the saliency map to generate an update metering map, and adjusting the exposure of the image based on the updated metering map. In some examples, the size of the metering map and the saliency map may be different and therefore the metering map and/or saliency map may be upscaled or downscaled to be the same size.

As another example, for autofocus. CPU 16 may be configured to determine a region in the image indicative of relatively higher saliency than one or more other regions of the image (e.g., where higher saliency refers to higher probability of attracting viewer gaze). CPU 16 may be configured to adjust the focus based on the determined region. For example, CPU 16 may be configured to control the location of the lens of camera 12 so that the determined region having the higher saliency appears sharper (e.g., clearer, more detailed, less burry, etc.) than other regions.

As another example, for auto-white balance, rather than evaluating the complete image, CPU 16 may determine the brightest part of regions having the highest saliency, based on brightness information provided by camera processor 14, as the white point. Utilizing the white point determined from the brightest part of the regions having the highest saliency, CPU 16 may configure camera 12 and/or camera processor 14 to perform the white balance. In such examples, there is a possibility that there is an unrealistic color cast on non-salient regions (e.g., regions having lower probability of attracting viewer gaze), while the white balance in the salient regions (e.g., regions that are likely to attract the viewer's gaze) is correct. However, having such unrealistic color cast on non-salient regions may not be problematic because the viewer may not look at those regions. In this way, the saliency map may assist the auto-white balance algorithm by biasing to correct in the regions around salient objects more than other regions.

In some examples, CPU 16 may utilize the saliency map to complement other techniques for determining autoexposure, autofocus, and/or auto-white balance. For instance, in some examples, CPU 16 may be configured to determine foreground objects and background objects. For instance, camera 12 may include a depth camera that CPU 16 utilizes to determine relative depths of objects to identify foreground objects and background objects. Some example techniques may be configured to autofocus on foreground objects. In one or more examples, CPU 16 may be configured to determine a region of interest (e.g., objects in the foreground objects), and then within that region of interest, CPU 16 may determine salient regions. That is, to generate the saliency map, CPU 16 may determine the saliency map within the determined region of interest. As another example, CPU 16 may determine the saliency map (e.g., for the entire image) and determine a region of interest (e.g., foreground objects). In this example, CPU 16 may determine which objects in the region of interest are also salient, and focus on the salient regions that are also in the region of interest.

One of the potential benefits of utilizing the saliency map may be that, although focusing on foreground objects works well in many instances, there may be times when focusing on foreground objects is not ideal. For instance, in some examples, an object further in the background may be of more interest. By utilizing the example techniques described in this disclosure, CPU 16 may determine that objects in the background are of more interest based on the saliency map. In such examples, CPU 16 may be configured to adjust the focus so that the background objects appear sharper in the image.

That is, relying simply on identification of foreground objects may result in poorer images as compared to example techniques that utilize a saliency map, as described in this disclosure. However, in examples where salient regions happen to be in the foreground, the example techniques may further complement the autofocus that is based on identification of foreground objects.

One possible issue with the use of saliency maps is that salient regions may be at different relative depths. As an example, there may be two objects at different depths that are relatively salient. In such cases, it may be unclear on which of the two objects to focus. This disclosure describes example ways in which CPU 16 may determine camera settings (e.g., autofocus setting, autoexposure setting, and/or auto-white balance setting), such as in cases where there are objects in salient regions at different depths. That is, salient regions may contain multiple depths, and this disclosure describes example techniques to choose which depth component should be focused on, or which depth component should be used for autoexposure and/or auto-white balance. Stated another way, CPU 16 may be configured to determine a most salient depth, and determine the camera setting based on the determined most salient depth. The most salient depth may refer to the depth component that should be used for determining the autofocus setting, autoexposure setting, and/or auto-white balance setting.

An example way to confirm the salient regions for determining (e.g., controlling) camera setting (e.g., autofocus, autoexposure, and/or auto-white balance settings) is by comparing the saliency maps of the image to one or more additional saliency maps generated for one or more additional images, where the one or more additional images are generated based on the image. For example, the image captured in preview mode or as part of a recording may be considered as a first image. CPU 16 may receive, during a preview mode or a recording, the first image.

CPU 16 may generate a first saliency map for the first image. CPU 16 (e.g., with GPU 18 and/or other components) may generate one or more additional images based on the first image (e.g., by manipulating pixels in the first image). As one example, CPU 16 may determine relative depths of objects in the first image. CPU 16 (e.g., with GPU 18 and/or other components) may manipulate pixels of objects in the first image, based on the depth of image content in the first image, to generate the one or more additional images. For instance, CPU 16 may manipulate pixels of objects in foreground of the first image to generate one or more additional images. For instance. CPU 16 and/or GPU 18 may remove the pixels of objects in the foreground (e.g., pixels having the least depth that are closest to camera 12) and perform digital inpainting to replace the removed pixels. The resulting image may be one example of the one or more additional images.

Manipulating pixels of objects based on depth of images (e.g., manipulating pixels of objects) in the foreground to generate one or more additional images is one example, and should not be considered limiting. Rather than or in addition to manipulating pixels of objects in the foreground, it may be possible to manipulate pixels of objects in the background, pixels of objects outside a field of view, or other pixels to generate the one or more additional images. Also, inpainting is one example technique for manipulating pixels of objects, and the example techniques should not be considered limited to inpainting.

As another example, CPU 16 may generate a first metering map for the first image based on the first saliency map (e.g., saliency map of the first image). CPU 16 may generate one or more additional images by changing tone of the first image. For instance, CPU 16 may simulate the result of applying the first metering map for the first image to generate a first additional image. Changing the tone may refer to adjusting the brightness of the first image based on the first metering map, and may be one way in which to manipulate pixels in the first image. There may be other ways to manipulate pixels in the first image.

In some examples, to generate the one or more additional images, CPU 16 and/or GPU 18 may manipulate pixels in an iterative process. For example, CPU 16 and/or GPU 18 may manipulate a set of pixels in the first image to generate a first additional image. CPU 16 and/or GPU 18 may then manipulate a set of pixels in the first additional image to generate a second additional image, and so forth. In such examples, CPU 16 and/or GPU 18 may be considered as generating the one or more additional images based on the first image. For instance, although the second additional image is generated from the first additional image, because the first additional image was generated for the first image, the second additional image may be considered as being generated from the first image.

CPU 16 and/or GPU 18 may generate a plurality of additional images by "multi-layer peeling." For example, the first image may be considered as having a plurality of layers, where each layer includes pixels of objects at approximately the same relative distance. CPU 16 and/or GPU 18 may manipulate pixels in a first layer to generate a first additional image, then manipulate a second layer in the first additional image to generate a second additional image, and so forth.

Accordingly, generating the one or more additional images may be considered as a process of manipulating a layer of the first image. Each layer of the first image may be considered as objects having the same relative depth, and generating the one or more additional images may be part of manipulating pixels corresponding to a particular layer (e.g., depth). For exposure, rather than "multi-layer peeling," CPU 16 may change the tone of pixels in the first image to manipulate pixels.

CPU 16 may determine one or more additional saliency maps for the one or more additional images (e.g., one additional saliency map for each of the additional images). CPU 16 may determine (e.g., control) a camera setting (e.g., autofocus setting, autoexposure setting, and/or auto-white balance setting) for camera 12 based on the first saliency map and the one or more additional saliency maps.

For example, CPU 16 may compare the first saliency map (e.g., saliency map of the first image) to the one or more additional saliency maps. Based on the comparison, CPU 16 may determine (e.g., control) the camera setting of camera 12. As an example, CPU 16 may determine whether the first saliency map and the one or more additional saliency maps are substantially the same. If the first saliency map and the one or more additional saliency maps are substantially the same, CPU 16 may determine that the salient regions determined in the first image or in the one or more additional images are the salient regions at the depth where autofocus should be, and adjust the autofocus setting to one or more of the salient regions.

For example, a difference in the first image and the one or more additional images may be that the foreground pixels in the first image are peeled to generate the one or more additional images. If the first saliency map of the first image and the one or more saliency maps of the one or more are the same, then it is likely that the objects in the foreground are not salient (e.g., not important to the scene composition). For instance, if the objects in the foreground were salient, then the first saliency map and the one or more additional saliency maps would be different since the one or more additional saliency maps are based on one or more additional images in which the foreground pixels are peeled.

However, in some cases, it may be possible that the first saliency map and the one or more additional saliency maps are different. In this case, it is likely that the objects in the foreground are salient, and focus may be adjusted to focus on the foreground.

In some examples, if the first saliency map and the one or more additional saliency maps are not substantially the same, CPU 16 may determine that the pixels for foreground objects are areas on which to autofocus. For example, if the first saliency map and the one or more additional saliency maps are not substantially the same. CPU 16 may determine that the pixels for which inpainting was performed are at the depth where there could be saliency. Hence, CPU 16 may determine that the pixels for objects that are further in the foreground should be where to autofocus.

As another example, in examples of multi-layer peeling, CPU 16 may determine whether the first saliency map is the same as the first additional saliency map, and if substantially the same, may determine whether the first saliency map is the same as the second additional saliency map, and so forth. CPU 16 may determine which of the additional saliency maps is different than the first saliency map. For instance, as layers are peeled (e.g., as pixels of object of each layer are manipulated), some of the additional saliency maps may be the same as the first saliency map. However, for one of the additional images, its associated additional saliency map may be different than the other saliency maps. In this case, CPU 16 may determine that the layer that was peeled when the saliency maps changed corresponds to the depth where the focus should be.

As an example, the first saliency map (e.g., saliency map of the first image) may be the same as the first additional saliency map and the second additional saliency map. In this example, the first additional saliency map is associated with a first additional image, and the second additional saliency map is associated with a second additional image. The first additional image may be based on the first image with the pixels associated with the most foreground objects being manipulated. The second additional image may be based on the first additional image with the pixels associated with the next most foreground objects being manipulated.

A third additional image may be based on the second additional image with the pixels associated with the next foreground objects being manipulated. In this example, the third saliency map associated with the third additional image may be different than the first saliency map, the first additional saliency map, or the second additional saliency map. CPU 16 may determine that the salient regions determined in the second additional saliency map correspond to the depth where the autofocus should be set, and adjust autofocus to salient regions in the second additional image.

For example, the first image may be generated with a lens of camera 12 at a first lens position. That is, when the image content of the first image is received in preview mode or recording, the lens position of camera 12 may be at a first lens position. To determine the camera setting (e.g., control the camera setting), CPU 16 may determine an autofocus setting that defines a second lens position for the lens of camera 12.

In a first case, CPU 16 may determine that the second lens position and the first lens position is the same. In the first case, for the autofocus setting, the lens position of the lens of camera 12 may have been in the appropriate position when the first image was received. In the first case, CPU 16 may avoid adjustment of a lens position of the lens.

In a second case, CPU 16 may determine that the second lens position and the first lens position is different. In the second case, for the autofocus setting, the lens position of the lens of camera 12 may need to be adjusted. Accordingly, CPU 16 may adjust a lens position of the lens to the second lens position.

In this way. CPU 16 may control a camera setting (e.g., determine an autofocus setting) based on whether a lens position of the lens of camera 12 is to be adjusted or not. The autofocus setting may define the lens position of the lens of camera 12 to ensure that the appropriate depth component is captured.

The above example techniques describe ways in which to determine whether the first saliency map is substantially the same or not substantially the same as the one or more additional saliency maps. There may be various ways in which to determine whether the first saliency map and the one or more additional saliency maps are substantially the same or not.

As one example, CPU 16 may perform a cross correlation between the first saliency map and the one or more additional saliency map. If the result of the cross correlation indicates that the first saliency map and the one or more additional saliency maps are correlated within a correlation threshold, CPU 16 may determine that the first saliency map and the one or more saliency maps are substantially the same. If the result of the cross correlation indicates that the first saliency map and the one or more additional saliency maps are not correlated within the correlation threshold, CPU 16 may determine that the first saliency map and the one or more saliency maps are not substantially the same.

As another example, CPU 16 may perform a sum of absolute difference process between the first saliency map and the one or more additional saliency map. For instance, CPU 16 may determine a pixel-by-pixel difference between pixels (e.g., subtract the pixel values) in the first saliency map and the one or more additional saliency maps. CPU 16 may determine a sum of absolute difference based on the difference. If the result of the sum of absolute difference is less than a threshold, CPU 16 may determine that the first saliency map and the one or more saliency maps are substantially the same. If the result of the sum of absolute difference is not less than the threshold, CPU 16 may determine that the first saliency map and the one or more saliency maps are not substantially the same.

As another example, CPU 16 may perform a mean square error process between the first saliency map and the one or more additional saliency map. For instance, CPU 16 may determine a pixel-by-pixel difference between pixels (e.g., subtract the pixel values) in the first saliency map and the one or more additional saliency maps. CPU 16 may determine a mean square error based on the difference. If the result of the mean square error is less than a threshold, CPU 16 may determine that the first saliency map and the one or more saliency maps are substantially the same. If the result of the mean square error is not less than the threshold, CPU 16 may determine that the first saliency map and the one or more saliency maps are not substantially the same.

Moreover, there may be other techniques such as face detection or pet detection, or object detection in general that the utilization of saliency map techniques described in this disclosure may complement for autofocus, autoexposure, and/or auto-white balance. However, generating, in real-time during the preview mode or the recording, a saliency map should not be confused with object detection. As explained above, the saliency map may be indicative of relative saliency of different regions within the image in attracting viewer gaze, such as probabilities (e.g., likelihood) that different regions within the image attract viewer gaze. There is a possibility that a salient region happens to be a region where is a face or a pet, or some particular object, but the saliency map may not identify the object type. However, the techniques should not be interpreted as excluding the identification of object type.

In some examples, CPU 16 may prioritize how to adjust exposure, focus, and white balance. For instance, if there is explicit user provided information for exposure, focus, and/or white balance, then CPU 16 may first prioritize using the user provided information to adjust the exposure, focus, and white balance. If an object detection algorithm detected an object, then CPU 16 may then prioritize using the information from the object detection algorithm to adjust the exposure, focus, and white balance. CPU 16 may then prioritize the saliency map to adjust exposure, focus, and white balance.

The above example prioritization order is provided merely as an example and should not be considered limiting. The prioritization order may be different. In some examples, CPU 16 may utilize some weighting of user provided information, object detection, and saliency map to adjust exposure, focus, and white balance.

Object detection techniques may generate information that identifies a location of a particular object but may not provide any indication of saliency (e.g., the probability that the object will attract the viewer's gaze). There is a possibility that an identified object will attract the viewer's gaze, but object detection may not generate such information. For example, if a person is standing next to a portrait of an individual, face detection may identify the face of both the person and the individual in the portrait but no information as to which of the two is more salient.

In the above examples, CPU 16 may utilize the saliency map for capturing images. However, the example techniques are not so limited. In one or more examples, CPU 16 may utilize the saliency map after the image is captured.

As one example, camera device 10 may include a video or image encoder that is configured to compress the image data associated with the captured image, such as in accordance with the High Efficiency Video Coding (HEVC) standard or the Versatile Video Coding (VVC) standard under development. Video or image encoding includes a quantization operation, in which values are quantized. Quantization is a lossy operation, meaning that some of the image content is lost, but tends to reduce the number of bits that need to be signaled to a video or image decoder for reconstructing the image. The quantization level for quantization impacts how sharp or blurry the image content is when decoded. In one or more examples, CPU 16 may determine the quantization level for the captured image(s) based on the saliency map. For example, the quantization level for salient region may be less than for non-salient region, so that the sharpness of the salient regions is maintained, while the non-salient regions may be blurry to save the number of bits that are signaled.

As another example, camera device 10 may determine zooming or cropping of the image based on the saliency map. For example, when image content is to be cropped, CPU 16 may ensure that regions determined to be salient, based on the saliency map, are not cropped out of the image.

Similarly, when zooming is enabled, CPU 16 may ensure that the resolution of the salient regions is relatively high to allow zooming into salient regions while maintaining the sharpness of the image. For example, saliency of different cropping may assist with automatic zooming to ensure that saliency is kept consistent throughout the zooming process.

As another example, camera device 10 may increase an amount of processing performed on regions having relatively higher saliency as compared to other regions. As one example, GPU 18, as part of rendering image content, may be configured to execute one or more pixel shaders (also called fragment shaders). The more pixel shaders that GPU 18 executes for rendering a region of the image, the sharper the image content will be for that region. For example, if GPU 18 executes 100 instances of the pixel shader for a region, then the resolution for that region will be 10×10. However, if GPU 18 executes 16 instances of the pixel shader for the same region, then the resolution for that region will be 4×4. Executing 100 instances of the pixel shader instead of 16 instances requires an increased amount of processing that is performed on regions having relatively higher saliency as compared to other regions (e.g., performed on salient regions as compared to non-salient regions). Controlling the number of pixel shaders that are executed for managing the resolution of different areas of the image is referred to as foveated rendering. There may be other ways in which to increase the amount of processing performed on salient regions as compared to non-salient regions, and the execution of pixel shaders for foveated rendering is one example.

In the above examples for image processing, CPU 16 may be configured to generate the saliency map in real-time or live (e.g., at run-time while the application is being used to capture the image and before the image is actually captured). However, in some cases, it may be possible for CPU 16 to not necessarily generate the saliency map in real-time, but at a later time such as when determining quantization levels for encoding the image, zooming or cropping the image, or rendering the image so as to increase an amount of processing performed on regions having relatively higher saliency as compared to other regions. For ease, the examples are described with real-time generation of the saliency map, but the example techniques are not so limited. Also, the above are a few non-limiting examples of utilization of the saliency map for image processing, and the example techniques should not be considered limited to the above examples.

In this way, CPU 16 may be configured to receive an image in preview mode or for recording (e.g., from camera processor 14 or camera 12), generate a saliency map indicative of probabilities that different regions within the image attract viewer gaze, and process the image based on the saliency map. Processing the image may include image capture processing. Examples of image capture processing include processing the image before capturing such as one or more of adjusting a white balance of a device configured to capture the image, adjusting a focus of the device configured to capture the image, or adjusting an exposure of the device configured to capture the image. Processing the image may also include processing the image after capturing such as one or more of determining quantization levels for encoding the image, zooming or cropping the image, or increasing an amount of processing performed on salient regions as compared to non-salient regions.

For example, CPU 16 may receive, during a preview mode or a recording, a first image. The first image may be generated with the lens of camera 12 at a first lens position. CPU 16 may generate a first saliency map indicative of relative saliency of different regions within a first image, where the relative saliency of the different regions may be indicative of a likelihood of attracting viewer gaze. CPU 16 may generate one or more additional images based on manipulating pixels in the first image, and generate one or more additional saliency maps indicative of relative saliency of different regions within the one or more additional images. In one or more examples, CPU 16 may determine (e.g., control), during the preview mode or the recording, a camera setting based on the first saliency map and the one or more additional saliency maps. One example of determining the camera setting includes controlling the camera setting based on the first saliency map and the one or more additional saliency maps.

As one example, to determine the camera setting, CPU 16 may determine an autofocus setting that defines a second lens position for the lens of camera 12. As described above, the first image is generated with a lens of camera 12 at a first lens position.

In a first case, CPU 16 may determine that the second lens position and the first lens position is the same, and avoid adjust of a lens position of the lens. In a second case, CPU 16 may determine that the second lens position and the first lens position is different, and adjust a lens position of the lens to the second lens position. In this way, CPU 16 may control, during the preview mode or the recording, the camera setting (e.g., autofocus setting) based on the first saliency map and the one or more additional saliency maps.

For example, CPU 16 may compare the first saliency map to the one or more additional saliency maps, and determine the autofocus setting based on the comparison. Examples of comparing the first saliency map to the one or more additional saliency maps includes one or more of performing a cross correlation, a sum of absolute difference process, or a mean square error process of pixel values.

As one example, to determine the autofocus setting based on the first saliency map and the one or more additional saliency maps, CPU 16 may be configured to compare the first saliency map with the one or more additional saliency maps, determine that the first saliency map and the one or more additional saliency maps are substantially the same, and adjust the autofocus based on regions having relative saliency in the first saliency map and the one or more additional saliency maps. As another example, to determine the autofocus setting based on the first saliency map and the one or more additional saliency maps, CPU 16 may be configured to compare the first saliency map with the one or more additional saliency maps, determine that the first saliency map and the one or more additional saliency maps are not substantially the same, determine foreground areas in the first image (e.g., based on the first saliency map and the one or more additional saliency maps not being substantially the same), and adjust the autofocus based on the foreground areas.

One example way of generating one or more additional images (e.g., by manipulating pixels in the first image) is by inpainting the first image to generate the one or more additional images. One example way of generating the one or more additional images based on the first image is by successively generating one or more additional images based on manipulating different layers (e.g., multi-layer peeling by manipulating pixels for objects at different relative depths). For example, the one or more additional images may include a first additional image and a second additional image. CPU 16 may be configured to generate one or more additional images based on manipulating pixels in the first image by manipulating pixels of the first image to generate the first additional image, and manipulating pixels of the first additional image to generate the second additional image. In this way, CPU 16 may generate the one or more additional images based on depth of image content in the first image (e.g., determining which pixels are for foreground objects, and manipulating those pixels).

The above describes determining (e.g., controlling) a camera setting, where the camera setting example is the autofocus setting. In some examples, determining (e.g., controlling) a camera setting may include determining an autoexposure setting.

For example, to generate the one or more additional images, CPU 16 may simulate different exposures on the first image by changing tone of the first image to generate the one or more additional images. Simulating different exposures may refer to generating simulating images having different tones (e.g., brightness). In such examples, to generate the one or more additional saliency maps, CPU 16 may generate the one or more additional saliency maps within the one or more additional images that are generated by simulating different exposures on the first image.

CPU 16 may generate a plurality of metering maps based on the first saliency map and the one or more additional saliency map. For instance, CPU 16 may generate a first metering map based on the first image and the first saliency map, generate a second metering map based on a first additional image and a first saliency map, and so forth. CPU 16 may determine an updated metering map based on the plurality of metering maps (e.g., by averaging the plurality of metering maps). CPU 16 may determine (e.g., control) the autoexposure setting based on the metering map.

In general, the saliency maps may include values for regions in the image, where the values are indicative of relative saliency of different regions within the image, and the relative saliency of the different regions is indicative of a likelihood of attracting viewer gaze (e.g., values indicative of the probability of attracting viewer gaze for corresponding regions or binary values indicative of whether corresponding regions are binary or not, as two non-limiting examples). Accordingly, in the saliency maps, areas in the image having higher probabilities of attracting viewer gaze may be identified differently than areas in the image having lower probabilities of attracting viewer gaze (e.g., different values). However, there may be other ways in which areas in the image having higher probabilities of attracting viewer gaze are identified differently than areas in the image having lower probabilities of attracting viewer gaze in the saliency maps.

As described above, in some examples, the weights (e.g., generated by one or more machine-learning models) to generate the saliency maps may be stored in system memory 30. In some examples, after generating the saliency maps, CPU 16 may store the saliency maps in system memory 30 for use in processing the image based on the saliency maps. Rather than or in addition to storing the saliency maps in system memory 30, CPU 16 may store the saliency maps in local memory of CPU 16. The memory that stores the saliency maps may be referred to as a camera property pool, which stores meta data of images.

Memory controller 24 facilitates the transfer of data going into and out of system memory 30. For example, memory controller 24 may receive memory read and write commands, and service such commands with respect to memory 30 in order to provide memory services for the components in camera device 10. Memory controller 24 is communicatively coupled to system memory 30. Although memory controller 24 is illustrated in the example of camera device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting frames from camera processor 14, etc. System memory 30 may additionally store information for use by and/or generated by other components of camera device 10. For example, system memory 30 may act as a device memory for camera processor 14.

Figure 2:
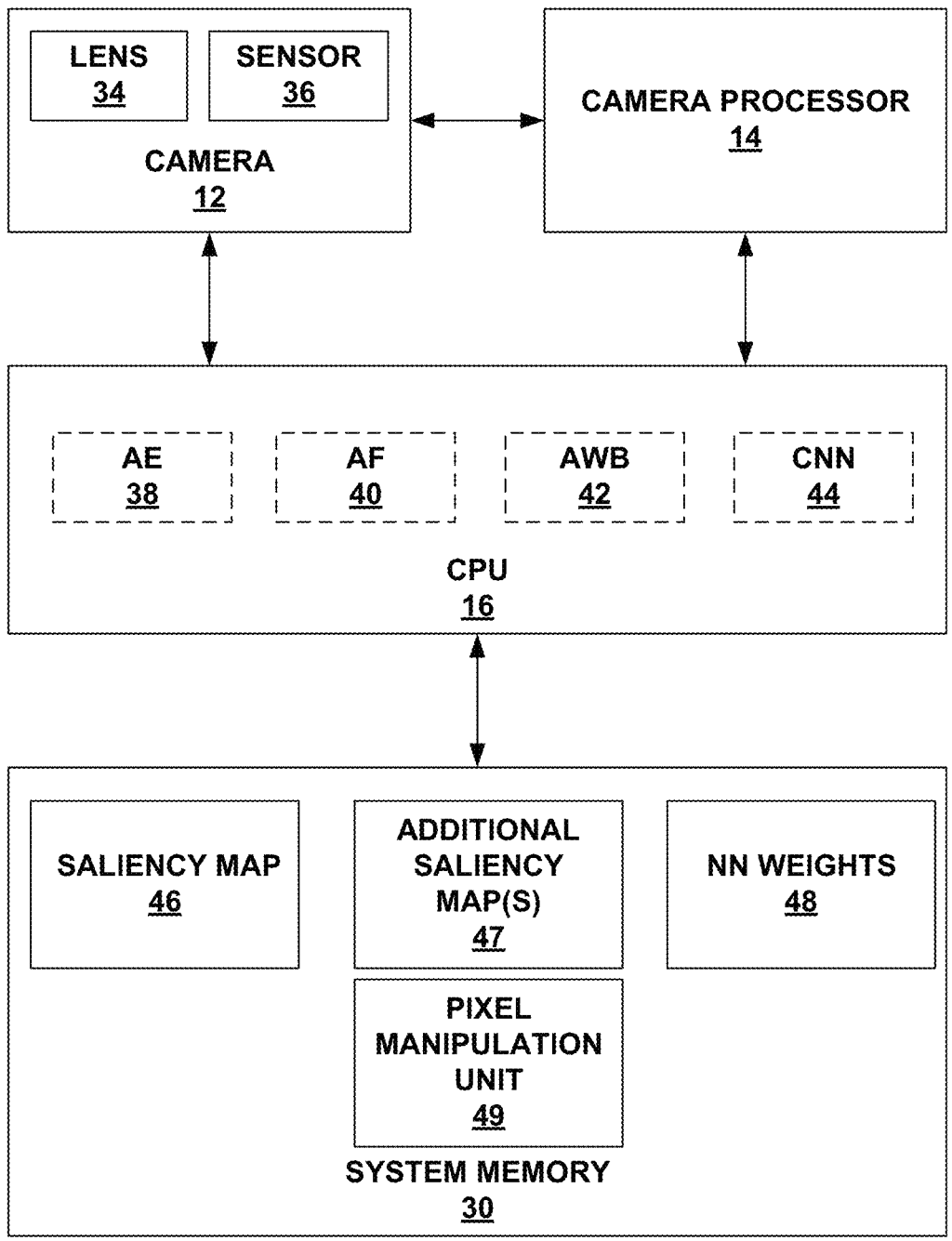
FIG. 2 is a block diagram illustrating the central processing unit (CPU) and system memory of the device of FIG. 1 in further detail.

FIG. 2 is a block diagram illustrating the central processing unit (CPU) and system memory of the device of FIG. 1 in further detail. As illustrated in FIG. 2, camera 12 includes lens 34 and sensor 36. CPU 16 may be configured to execute autoexposure application 38, autofocus application 40, and auto-white balance application 42. CPU 16 may also be configured to execute convolutional neural network (CNN) application 44 to generate saliency map 46 and one or more additional saliency maps 47 stored in system memory 30. System memory 30 may also store neural network (NN) weights 48.

In one or more examples, system memory 30 may store the object code for autoexposure application 38, autofocus application 40, auto-white balance application 42, and CNN application 44 that CPU 16 retrieves and executes. In one or more examples, rather than being software applications executing on CPU 16, CPU 16 may include specialized hardware to perform the operations of autoexposure, autofocus, auto-white balance, as well as specialized hardware to generate saliency map 46 and one or more additional saliency maps 47.

As one example, camera device 10 may include a vector processor (not shown). A vector processor may be specialized hardware configured to perform the multiplication operation relatively quickly. As described above, generating a saliency map, like saliency map 46 or one or more additional saliency maps 47, may include many multiplying operations of sample values from the image. CPU 16 (e.g., via CNN application 44) may offload the multiplication task to the vector processor.

In one or more examples, light enters through lens 34 and is received by sensor 36. Autofocus application 40 may modify the location of lens 34 within camera 12 so adjust the focus of lens 34. For instance, by modifying the location of lens 34, autofocus application 40 may control the focal point to sensor 36, and therefore control which portions of the image content will be in focus.

For autoexposure, autoexposure application 38 may be configured to determine which area of the image content to use for exposure metering or spatial metering map. As an example, autoexposure application 38 may utilize a metering map. The metering map may be considered as a weight map across the image. The metering map may indicate to autoexposure application 38 if there is a need to change global exposure in order to brighten or darken the image.

Changing of the aperture (i.e., the area over which light can enter lens 34 and/or reach sensor 36), possibly along with shutter speed and sensor gain, may be example ways in which autoexposure application 38 may achieve the desired exposure change. For instance, autoexposure application 38 may also utilize the metering map, or some other technique, to control the shutter speed (e.g., amount of time light is allowed to enter lens 34 and/or reach sensor 36) and the sensitivity to light of sensor 36.

In some examples, the metering map is center biased, which means that autoexposure application 38 may be biased toward assuring that the center pixels are properly exposed, and pixels towards the edge are less exposed. There may be other examples of metering maps, and the techniques are not limited to metering maps that are biased towards exposure control for a middle area of the image. In one or more examples, system memory 30 may store various metering maps (e.g., user selectable metering maps) and autoexposure application 38 may utilize the user selected metering map.

Auto-white balance application 42 may be configured to control the white balance. Auto-white balance application 42 may determine the temperature of the white color in the image and generate image content based on the determined temperature of the white color. For example, if there is mixed lighting (e.g., shaded area and non-shaded area), the temperature of the white color may be different in the shaded area as compared in the non-shaded area. Auto-white balance application 42 may be configured to determine an adequate temperature for the white color to minimize unrealistic color cast on the shaded and non-shaded regions.

While autoexposure application 38, autofocus application 40, and auto-white balance application 42 may operate relatively well, there may be certain limitations. For example, autofocus may be improved by ensuring lens 34 is focused on salient regions in the image, resulting in better quality images where the sharpness of salient regions is maintained. Some techniques, such as face detection or object detection, assist in identify objects on which lens 34 can focus, and autofocus application 40 may cause lens 34 to focus on the detected objects. However, such object detection algorithms do not indicate whether the detected object is salient or not (e.g., as determined by training a neural network according to gaze tracking data of human viewers over a plurality of training images).

For autoexposure setting, autoexposure application 38 may be configured to utilize a metering map. However, the metering map may not account for saliency of the image content. Rather, the metering map may be set to expose a certain area in the image such as a center, but there is a possibility that the center does not include any salient content, and the salient content is located elsewhere in the image. Accordingly, the use for saliency map for autoexposure setting may be beneficial.

For auto-white balance setting, auto-white balance application 42 may be configured to determine the temperature of the white color so that shaded areas and non-shaded areas appear suitable (e.g., both have some amount of unrealistic color cast). However, if the shaded areas are more salient than the non-shaded areas, better images may be captured by setting the white color temperature based on the shaded area. In this case, there may be more color cast on the non-shaded area. However, because the non-shaded area is not salient, there may not be any negative impact from the color cast, but there may be benefit because the salient area does not have the color cast.

In one or more examples, CPU 16 may be configured to execute CNN application 44 to generate saliency map 46 and one or more additional saliency maps 47 that CPU 16 utilizes for one or more of autofocus, autoexposure, or auto-white balance settings. The example techniques to generate saliency map 46 and one or more additional saliency maps 47 may be invariant from the way in which CPU 16 may determine the autofocus, autoexposure, and auto-white balance settings. For example, CNN application 44 may not utilize an image generated after capture with the autofocus, autoexposure, and auto-white balance determined by autofocus application 40, autoexposure application 38, and auto-white balance application 42, respectively. CPU 16 may utilize saliency map 46 and/or one or more additional saliency maps 47 to update the autofocus, autoexposure, and/or auto-white balance.

CPU 16 (e.g., via CNN application 44) may be configured to generate saliency map 46 and one or more saliency maps 47 in real-time during the preview mode or recording of images, where saliency map 46 is indicative of indicative of relative saliency of different regions within the image and one or more saliency maps 47 are indicative of relative saliency of different regions within one or more additional images generated based on the image used to generate saliency map 46.

For example, the image used to generate saliency map 46 may be a first image, and saliency map 46 may be a first saliency map. CPU 16 may generate one or more additional images based on the first image. For instance, CPU 16 may execute pixel manipulation unit 49. Although pixel manipulation unit 49 is illustrated as being software that CPU 16 executes, the example techniques are not so limited. Pixel manipulation unit 49 may be implemented as fixed-function circuitry or some combination of hardware and software.

Pixel manipulation unit 49 may be configured to manipulate pixels in the first image to generate the one or more additional images. CPU 16 may execute CNN application 44 to generate the one or more additional saliency maps 47, one for each of the one or more additional images.

As one example, CPU 16 may determine relative depths of objects in the first image. For instance, CPU 16 may utilize a phase detection autofocus (PDAF) algorithm to generate information of relative depths, but other techniques such as time of flight (ToF) are also possible. In PDAF, sensors within camera 12 (or possibly some other sensors) may capture two images of image content for purposes of determining relative depth. The images captured for determining relative depths need not necessarily be high resolution images, but it may be possible for the pictures to be high resolution. The relative disparity of image content in the two images may be indicative of the depth of the objects. Utilizing the relative disparity, CPU 16 may generate a depth map that indicates the relative depths of objects in the first image. PDAF is described in more detail below.

Pixel manipulation unit 49 may manipulate pixels of objects based on the relative depths of the objects. As one example, pixel manipulation unit 49 may remove the pixels of objects that are in the foreground, as indicated by the depth map, and replace the pixels with inpainting. One example way to perform inpainting includes removing pixels and blending neighboring pixels to generate the pixels for the removed pixels. Another way to perform inpainting may be by blurring pixels in the foreground. Inpainting is one example, and other techniques to manipulate the pixels are possible. The result from the operations of pixel manipulation unit 49 may be a first additional image. Pixel manipulation unit 49 may repeat such operations on the first additional image (e.g., inpaint pixels of objects in the foreground in the first additional image) to generate a second additional image, and so forth.

As noted above, CPU 16 may execute CNN application 44 to generate the one or more additional saliency maps 47, one for each of the one or more additional images. For example, CPU 16 may generate a first additional saliency map for the first additional image, where the first additional saliency map is one of the one or more additional saliency maps 47. CPU 16 may generate a second additional saliency map for the second additional image, where the second additional saliency map is another one of the one or more additional saliency maps 47, and so forth.

Saliency map 46 and/or one or more additional saliency maps 47 may indicate the saliency for the entire image. For example, saliency map 46 and/or one or more additional saliency maps 47 may not be just a bounding box for a region of interest (ROI) or a bounding box from object detection. In some examples, saliency map 46 and one or more additional saliency maps 47 may be a map of the entire image (e.g., first image) or respective additional images that indicates which parts are salient and which parts are not salient.

To generate saliency map 46 and/or one or more additional saliency maps 47, CNN application 44 may be configured to utilize NN weights 48. NN weights 48 may be weights of a trained model that is generated from saliency points, on a plurality of training images, identified based on eye tracking of one or more viewers viewing the training images.

CNN application 44 (e.g., possibly with use of a vector processor) may be configured to utilize weights 48, stored in system memory 30 but weights 48 may be stored in some other memory, generated by training data with one or more machine-learning models to process sample values from the image to identify areas in the image having higher probabilities of attracting viewer gaze differently than areas in the image having lower probabilities of attracting viewer gaze. That is, saliency map 46 and/or one or more additional saliency maps 47 may include values that map to regions in the image or respective one or more additional images, and the values indicate the probability of attracting viewer gaze or may be binary values that indicate whether a region is salient or not is also possible. Hence, the values in the saliency map for an area in the image having higher probabilities of attracting viewer gaze is different than the values in the saliency map for an area in the image having lower probabilities of attracting viewer gaze.

There may be various ways in which to represent saliency map 46 and/or one or more additional saliency maps 47. As one example, saliency map 46 and/or one or more additional saliency maps 47 may be a two-dimensional map of values, where each value is associated with a region of the image and has a value of between 0 and 255. A value of 255 may mean that an associated region in the image has high saliency, and a value of 0 may mean that an associated region in the image has a low saliency.

As described above, NN weights 48 may be generated by one or more machine-learning models. The following describes one example way in which to generate NN weights 48. During training, one or more processors on one or more servers in a cloud network may be configured to determine saliency points, on a plurality of training images, identified based on eye tracking of one or more viewers viewing the plurality of training images (e.g., 10,000 images). Although described with respect to one or more processors on one or more servers in the cloud network, it may be possible to generate NN weights 48 (e.g., the trained model) on camera device 10 (e.g., CPU 16).

From the saliency points, the one or more processors may generate information of the salient regions, referred to as the "ground truths." The one or more processors may feed the training images and the ground truths, and train one or more machine learning models to generate weights for a convolutional neural network, like CNN application 44, such that when the weights are applied to the training images, the result is a saliency map that is similar to the ground truths. System memory 30 may store the weights generated by the one or more machine-learning models as NN weights 48.

For new images (e.g., from preview mode or during recording), CNN application 44 may utilize NN weights 48 to generate saliency map 46 and/or one or more additional saliency maps 47. Accordingly, saliency map 46 and/or one or more additional saliency maps 47 may be considered as a machine learning model-based saliency map 46 and/or one or more additional saliency maps 47. In some examples, CNN application 44 may utilize 2+16 convolution layers with 3×3 kernels with eight channels (e.g., a sequency of 16 convolution layers, with kernel size of 3×3 and 8 channels per layer) on most layers to generate the machine learning model-based saliency map 46 and/or one or more additional saliency maps 47.

For example, CNN application 44 may be constructed with many sequential layers, each working on the output of the previous layer. Examples of the layers include convolution layers and activation layers. In some examples, these two types of layers may be interleaved. The convolution layers multiply all channels of a previous layer of a sample and its surroundings (e.g., utilizing a 3×3 kernel). For instance, if the previous layer has 32 channels and 3×3 kernel is used, then the new layer output is the result of multiplying 32×3×3 numbers and summing them. This is repeated for each of the layers. As described in more detail, in some examples, the input image may be downscaled to a size of 128×96, which means that CPU 16 (or a DSP, if DSP is executing or performing the operations of CNN application 44) may need to multiply 128×96×32×3×3×32 times. Activation layers are simple, non-linear response functions that are applied for each channel. Some common functions include: ReLU (rectified linear unit), PReLU (parametric ReLU), ELU (exponential linear unit), TAHH, and Sigmoid.

As described above, CNN application 44 may utilize a total of 18 convolutional layers (e.g., 2+16 convolution layers). Two of those convolution layers are "strided convolution" meaning that they are used to downscale. Accordingly, for an input image of size 128×96, the first downscaling is to 64×48, and the second downscaling is then to 32×24. By downscaling, the number of multiplications can be reduced. All the following layers are not strided, but include padding so to remain in the size of 64×48. However, the padding is not necessary in all examples. Accordingly, in this example, the size of the saliency map generated by CNN application 44 is size of 64×48, and in examples where padding is not used, the size of the saliency map is 32×24. Some examples of CNN application 44 include sequential network, U-Net, resNET (residual neural network), VGG-Net (Visual Geometry Group Net), and the like.

Accordingly, to generate saliency map 46 and/or one or more additional saliency maps 47, CNN application 44 may receive as an input a downscaled (e.g., downsampled) version of the image (e.g., first image and/or one or more additional images). For example, CPU 16 may downscale the image (e.g., having resolution of 1024×768, as one non-limited example) to a generate an N×M sized downscaled image (e.g., 128×96 RGB image). CNN application 44 may perform the example techniques on the downscaled image (e.g., generate saliency map 46 based on the downscaled image and/or generate one or more additional saliency maps 47 based on the downscaled one or more additional images). The output from CNN application 44 is saliency map 46 and/or one or more additional saliency maps 47. A size of saliency map 46 and/or one or more additional saliency maps 47 is X×Y, where at least one of X is less than N or Y is less than M. For example, the size of saliency map 46 and/or one or more additional saliency maps 47 may be 32×24. CNN application 44 may store saliency map 46 and/or one or more additional saliency maps 47 in a property pool, which may be a designated memory space (e.g., within system memory 30 or elsewhere) configured to store metadata for images.

CPU 16 may then utilize saliency map 46 and/or one or more additional saliency maps 47 to adjust one or more of a white balance, focus, and/or exposure settings (i.e., adjust a camera setting). For example, in saliency map 46, there may be different salient regions at different depths, and it may be unclear at which depth to use for the autofocus setting. One example way to determine the depth of the autofocus is based on comparing saliency map 46 with one or more additional saliency maps 47.

For example, CPU 16 may compare the first saliency map 46 to the one or more additional saliency maps 47, and determine (e.g., control) the camera setting (e.g., the autofocus, white balance, and/or exposure settings) based on the comparison. Comparing the first saliency map 46 to the one or more additional saliency maps 47 may include one or more of performing a cross correlation, a sum of absolute difference process, or a mean square error process on the pixel values.

For instance, to generate the one or more additional images, CPU 16 and/or GPU 18 may manipulate pixels (e.g., inpainting) corresponding to different depths. For instance, a first additional image may be generated with pixels corresponding to objects in the foreground being manipulated, a second additional image may be generated with pixels corresponding to objects in the next most foreground being manipulated, and so forth. If the first saliency map 46 is the same as a first additional saliency map corresponding to the first additional image, then the depth for the autofocus should be in the salient regions that are the same for the first image and the first additional image. For instance, first saliency map 46 and the first additional saliency map being the same may imply that the foreground pixels are not that salient. In some examples, since the first additional image is generated by inpainting the foreground pixels (e.g., interpolating or blurring the foreground pixels) of the first image, for first saliency map 46 and the first additional saliency map to be the same, the foreground pixels may not be salient. If the foreground pixels were salient, then first saliency map 46 and the first additional saliency map would be different.

If, however, the first saliency map 46 is not the same as the first additional saliency map corresponding to the first additional image, then the autofocus may need to be more in the foreground than the first additional saliency map would indicate. For instance, first saliency map 46 and the first additional saliency map being different may imply that the foreground pixels are salient because when the foreground pixels were inpainted, the salient regions changed.

As another example way to generate the one or more additional images, pixel manipulation unit 49 may simulate different exposures on the first image by changing tone of the first image (e.g., changing brightness on the first image). CNN application 44 may generate the one or more additional saliency maps 47 within the one or more additional images that are generated by simulating different exposures on the first image.

Autoexposure application 38 may generate a plurality of metering maps based on saliency map 46 and one or more additional saliency maps 47. For instance, autoexposure application 38 may generate a first metering map for a first image based on saliency map 46, generate a second metering map for a first additional image based on a first additional saliency map of one or more additional saliency maps 47, generate a third metering map for a second additional image based on a second additional saliency map of one or more additional saliency maps 47, and so forth. Autoexposure application 38 may determine an updated metering map based on the plurality of metering maps (e.g., by averaging). Autoexposure application 38 may determine an autoexposure setting based on the updated metering map.

As one example, to determine (e.g., control) autofocus, auto-white balance, or autoexposure settings based on the first saliency map 46 and the one or more additional saliency maps 47, CPU 16 may be configured to compare the first saliency map 46 with the one or more additional saliency maps 47, and determine that the first saliency map 46 and the one or more additional saliency maps 47 are substantially the same (e.g., the cross-correlation satisfies a correlation threshold, the sum of absolute difference is less than a threshold, or the mean square error is less than a threshold). CPU 16 (e.g., via autoexposure application 38, autofocus application 40, or auto-white balance application 42) may determine the autofocus, autoexposure, or auto-white balance settings based on regions having relative saliency in the first saliency map 46 and the one or more additional saliency maps 47.

As another example, to determine autofocus, auto-white balance, or autoexposure settings based on the first saliency map 46 and the one or more additional saliency maps 47, CPU 16 may be configured to compare the first saliency map 46 with the one or more additional saliency maps 47, and determine that the first saliency map 46 and the one or more additional saliency maps 47 are not substantially the same (e.g., the cross-correlation does not satisfy a correlation threshold, the sum of absolute difference is not less than a threshold, or the mean square error is not less than a threshold). In response to determining that the first saliency map 46 and the one or more additional saliency maps 47 are not substantially the same, CPU 16 may determine foreground areas in the first image. CPU 16 (e.g., via autoexposure application 38, autofocus application 40, or auto-white balance application 42) may determine the autofocus, autoexposure, or auto-white balance setting based on the foreground areas.

As one example, CPU 16 may substitute the metering map that autoexposure application 38 is to utilize with saliency map 46 (e.g., based on the comparison between saliency map 46 and one or more additional saliency maps 47). However, there may be a chance that saliency map 46 is imperfect. In one or more examples, CPU 16 may scale saliency map 46 with the metering map to generate an updated metering map. To scale saliency map 46 with the metering map, CPU 16 may determine a scaling weight to apply to the metering map, where the scaling weight is based on the saliency value in saliency map 46. CPU 16 may perform similar scaling operations of metering maps for the one or more additional images, such as for determining the autoexposure setting.

Figure 3:
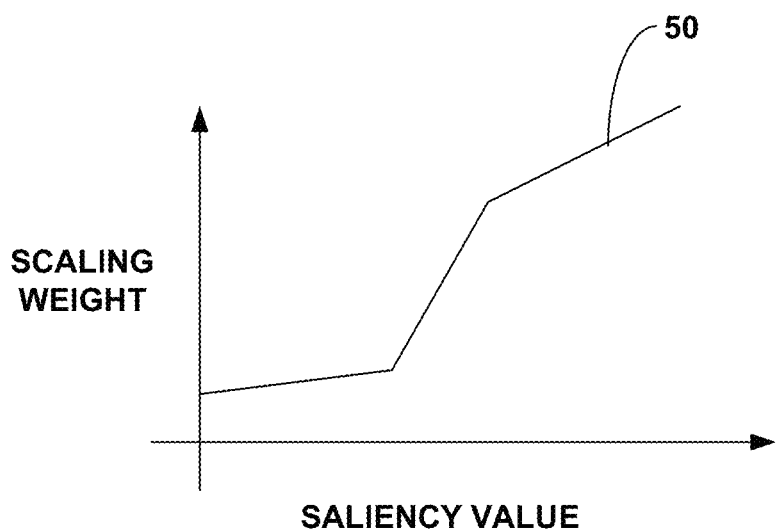
FIG. 3 is a graph illustrating scaling weights to be applied for autoexposure as a function of saliency values.

FIG. 3 is a graph illustrating scaling weights to be applied for autoexposure as a function of saliency values. For instance, FIG. 3 illustrates line 50 that represents the scaling weight that CPU 16 is to apply to a metering map based on the saliency value. In some examples, rather than utilizing the line 50, system memory 30 may store a look-up table that indicates the scaling weight to apply to the metering map for a saliency value.

As described above, in some examples, the size of saliency map 46 may be relatively small (e.g., 32×24). The size of the metering map may be different (e.g., bigger or smaller) than the size of saliency map 46. CPU 16 may interpolate the values of saliency map 46 to upscale or downscale the size of saliency map 46 to the size of the metering map. CPU 16 may then determine the scaling weights based on the upscaled or downscaled saliency map 46. It may be possible to upscale or downscale the metering map in addition to or instead of saliency map 46.

CPU 16 may multiply the scaling weight with values (e.g., as illustrated by line 50) of the metering map to generate an updated metering map. Autoexposure application 38 may utilize the updated metering map to adjust the exposure (e.g., aperture) based on the updated metering map. In this way, there will be higher metering weight to the salient regions, and ensure that the salient regions are properly exposed.

Referring back to FIG. 2, in one or more examples, autofocus application 40 may utilize saliency map 46 and/or one or more additional saliency maps 47 to determine on which areas to focus lens 34. For example, autofocus application 40 may determine a region in the image having relatively higher saliency than one or more other regions of the image. Autofocus application 40 may adjust the focus (e.g., lens position of lens 34) based on the determined region. However, autofocus application 40 may confirm that the depth of the salient regions of saliency map 46 is where the autofocus should be based on the comparison of saliency map 46 with the one or more additional saliency maps 47. For instance, if saliency map 46 is substantially the same as one or more additional saliency maps 47, then autofocus application 40 may autofocus based on salient regions in saliency map 46 and/or one or more additional saliency maps 47. However, if saliency map 46 is not substantially the same as one or more additional saliency maps 47, then autofocus application 40 may autofocus based on objects in the foreground of the image used to generate saliency map 46.

Moreover, in some examples, autofocus application 40 may determine whether there should be a change to the autofocus setting. For example, the first image may be generated with lens 34 of camera 12 at a first lens position, and to determine the camera setting, autofocus application 40 may determine an autofocus setting that defines a second lens position for lens 34. That is, based on comparison of saliency map 46 and one or more saliency maps 47, autofocus application 40 may determine a second lens position for lens 34.

Autofocus application 40 may determine whether the second lens position and the first lens position is the same or different. For example, in a first case, autofocus application 40 may determine that the second lens position and the first lens position is the same, and avoid adjustment of a lens position of lens 34. In a second case, autofocus application 40 may determine that the second lens position and the first lens position is different, and adjust a lens position of lens 34 to the second lens position.

In some examples, autofocus application 40 may utilize saliency map 46 to complement the area to focus determined by autofocus application 40 using other techniques. For instance, autofocus application 40 may be configured to utilize phase detection autofocus (PDAF). In PDAF, autofocus application 40 may utilize phase difference between light captured on different photodiodes of sensor 36 to control which area should be focused. PDAF may be based on comparison of two or more images generated with different asymmetric apertures. When the main lens is not in focus, it is possible to detect disparity caused by the different shape of the asymmetric blur. The size and direction of the disparity is correlated with the defocus amount and direction. Auto focus, on camera device 10, may use PDAF implemented at sensor pixel level, using masking layers, dual diodes, or special ulens designs. This allows camera device 10 to focus reliably and efficiently in little or no added cost.

As another example, autofocus application 40 may be configured with object detection (e.g., face detection, pet detection, etc.), and configured to focus on detected objects. As another example, autofocus application 40 may be configured to detect objects that are in the foreground, and configured to focus on objects in the foreground. Foreground detection may also be performed with PDAF, where relative disparity of image content between images captured for PDAF indicates depth. PDAF to determine depth is one example, and other techniques to determine depth may be possible.

In these example techniques (e.g., PDAF, object detection, foreground detection) or other techniques such as stereo disparity, structured light, or time of fight to detect foreground, autofocus application 40 may be configured to determine a region of interest (ROI), and focus on the ROI. To complement such example techniques, CPU 16 (e.g., via CNN application 44) may be configured to determine saliency map 46 and/or one or more additional saliency maps 47 within the ROI. For example, by determining saliency map 46 and/or one or more additional saliency maps 47 within the ROI, autofocus application 40 may optimize focus more locally within the ROI. As another example, CPU 16 may determine which regions in saliency map 46 and/or one or more additional saliency maps 47 that are identified as having relatively high saliency are also within an ROI determined from object detection or foreground detection, and focus more locally on those regions that are also in the ROI.

In one or more examples, auto-white balance application 42 may utilize saliency map 46 to determine the area from which the temperature of the white color should be determined (e.g., based on comparison of saliency map 46 and one or more additional saliency maps 47). For example, auto-white balance application 42 may utilize the areas in the image that are more salient (e.g., have higher probability of attracting viewer gaze) for determining the temperature of the white color.

Figure 4:
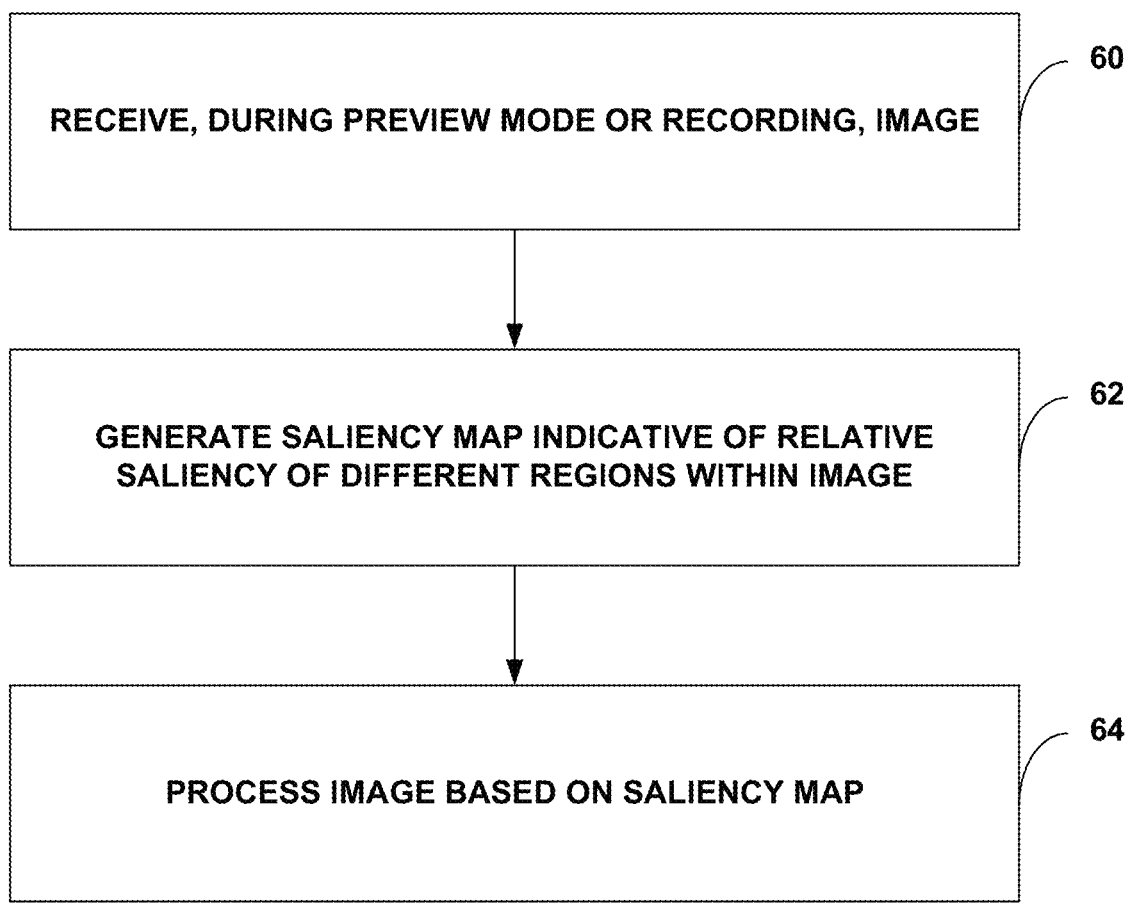
FIG. 4 is a flowchart illustrating an example method of operation in accordance with one or more examples described in this disclosure.

FIG. 4 is a flowchart illustrating an example method of operation in accordance with one or more examples described in this disclosure. The example techniques of FIG. 4 are described with respect to one or more processors, examples of which include camera processor 14, CPU 16, GPU 18, display interface 26, or some other processor (e.g., vector processor).

The one or more processors may receive, during a preview mode or for recording, a first image (60). For example, a user may configure camera device 10 to prepare to take a picture. In this case, display 28 may display image content of the image that the user may take. The time when display 28 is displaying the image content of the image before the user takes the image may be the preview mode. When the user is recording a movie, the user may be taking a plurality of pictures.

The one or more processors may generate saliency map 46 indicative of relative saliency of different regions within the image (62). For example, the saliency map 46 may be indicative of probabilities (e.g., likelihood) that different regions within the image attract viewer gaze. As one example, the one or more processors (e.g., via CNN application 44 and possibly a vector processor) may utilize weights 48, stored in system memory 30, generated by one or more machine-learning models to process sample values from the image to identify areas in the image having higher probabilities of attracting viewer gaze differently than areas in the image having lower probabilities of attracting viewer gaze. Weights 48 generated by the one or more machine learning models may be generated from saliency points, on a plurality of training images, identified based on eye tracking of one or more viewers viewing the plurality of training images.

In some examples, the one or more processors may determine a region of interest in the image (e.g., based PDAF, object detection, or foreground detection). In such examples, generating saliency map 46 may include determining saliency map 46 within the determined region of interest.

The one or more processors may process the image based on the saliency map (64). For example, processing the image may include one or more of adjusting a white balance of device configured to capture the image, adjusting a focus of the device configured to capture the image, or adjusting an exposure of the device configured to capture the image. As other examples, processing the image may include one or more of determining quantization levels for encoding the image, zooming or cropping the image, or increasing an amount of processing performed on regions having relatively higher saliency as compared to other regions.

As one example way in which to adjust exposure, the one or more processors may be configured to scale a metering map for autoexposure based on saliency map 46 to generate an updated metering map. In such examples, processing the image may include adjusting exposure of the image based on the updated metering map.

As one example way in which to adjust focus, the one or more processors may be configured to determine a region in the image having relatively higher saliency than one or more other regions of the image based on the saliency map. In such examples, processing the image may include adjusting focus based on the determined region.

Figure 5:
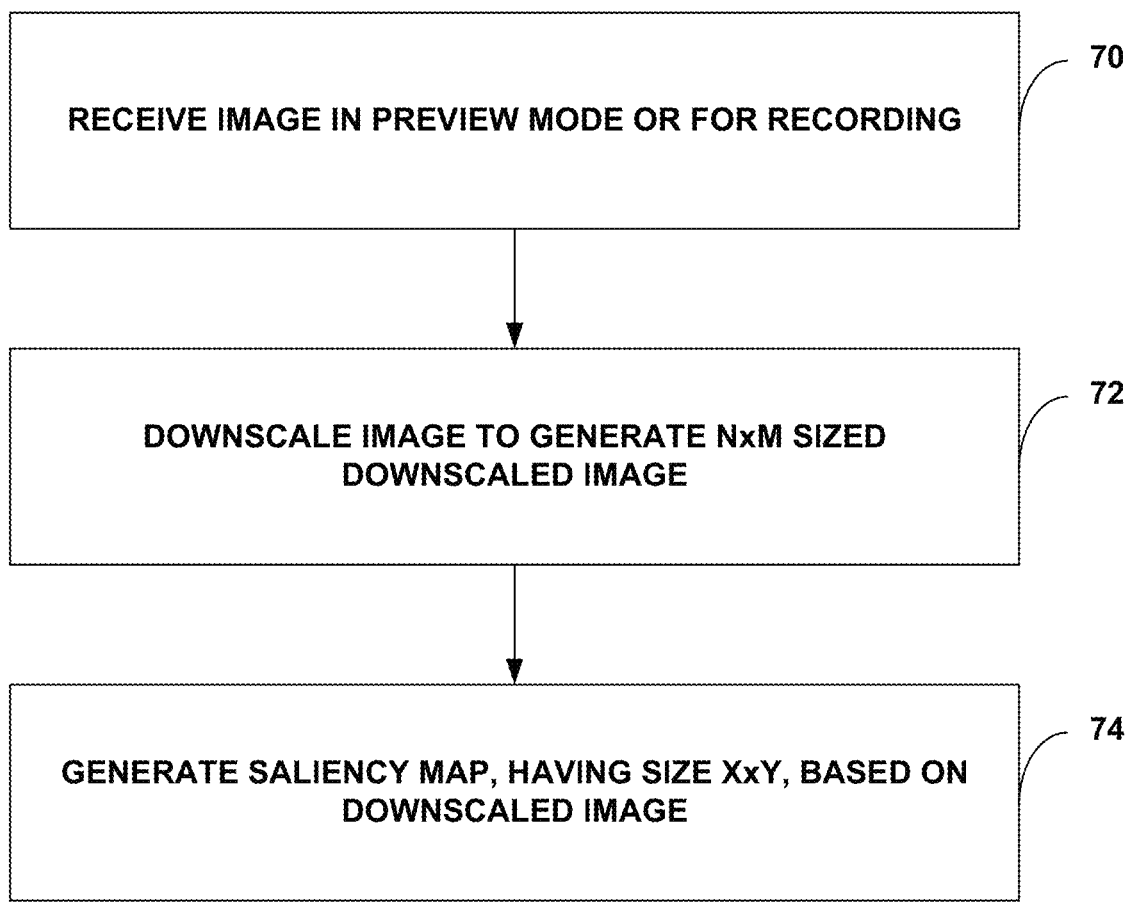
FIG. 5 is a flowchart illustrating another example method of operation in accordance with one or more examples described in this disclosure.

FIG. 5 is a flowchart illustrating another example method of operation in accordance with one or more examples described in this disclosure. For example, FIG. 5 illustrates an example way in which to generate saliency map 46. As described above, the one or more processors may receive the image in preview mode or for recording (70).

The one or more processors may downscale (e.g., downsample) the image to generate an N×M size downscaled image (72). As one example, N×M is 128×96. The one or more processors may generate saliency map 46, having size X×Y, based on the downscaled image (74). In one example, where at least one of X is less than N or Y is less than M. i.e., X<N and/or Y<M. For example, CNN application 44 may receive the downscaled image having size 128×96 and output saliency map 46 having size 32×24.

In the examples of FIGS. 4 and 5, CPU 16 may utilize on average 4.45 milliseconds, a minimum of 0.75 milliseconds, and maximum of 15.4 milliseconds to downscale the image to generate the N×M sizes downscaled image (e.g., in FIG. 5). CPU 16 may utilize on average 4.09 milliseconds, a minimum of 2.52 milliseconds, and a maximum of 12.15 milliseconds to generate saliency map 46. CPU 16 may utilize on average 0.1 milliseconds, a minimum of 0.02 milliseconds, and a maximum of 1.53 milliseconds to adjust the focus, exposure, and/or white balance based on saliency map 46. Accordingly, in some examples, the maximum time to process the image based on the saliency map may be 19.17 milliseconds, with on average time being 8.78 milliseconds. Because the amount of time to process the image based on saliency map is less than 10 ms (on average), there is sufficient time for the saliency map to be available for every frame in preview mode and video recording.

Figure 6:
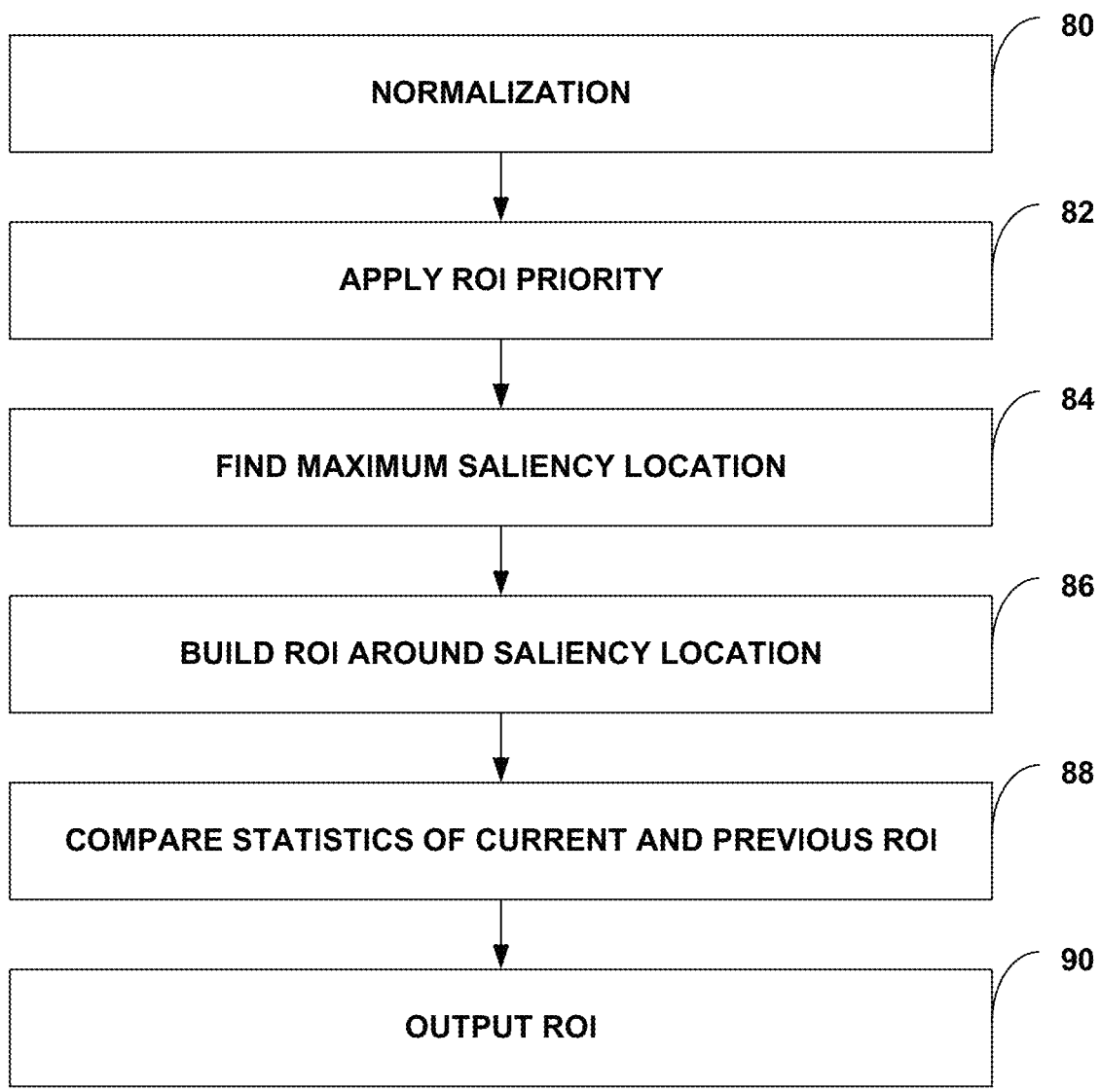
FIG. 6 is a flowchart illustrating another example method of operation in accordance with one or more examples described in this disclosure.

FIG. 6 is a flowchart illustrating another example method of operation in accordance with one or more examples described in this disclosure. For example, FIG. 6 illustrates an example of utilizing a saliency map for determining ROIs in images. As described above, in some examples, CNN application 44 may utilize saliency within a determined ROI (e.g., determined from PDAF, object detection, or foreground detection) for autofocus. However, in some examples, rather than utilizing PDAF, object detection, or foreground detection, it may be possible to use saliency map 46 to determine the ROI.

One or more processors may normalize the saliency values of saliency map 46 to be within a particular range (80). One or more processors may apply previous ROI and center ROI priority multipliers for ROI stabilization (82). For instance, from image to image (e.g., such as in video recording), there may not be a substantial change in the ROI. The one or more processors may utilize the ROI in a previous image as well as center of saliency map 46 to generate an area within which the ROI for the current image can be.

The one or more processors may find maximum saliency location (84). For example, the one or more processors may determine where the saliency is the greatest in saliency map 46. The one or more processors may build an ROI around the saliency location (86). For instance, based on the priority multipliers and various heuristics evaluated based on ROI center and size, the one or more processors may determine an ROI for the current image.

In some examples, the one or more processors may compare the statistics of the current ROI and the previous ROI (88). For example, the one or more processors may compare statistics like ROI saliency sum and maximum saliency to determine if the change in the ROI from the previous ROI is stable (e.g., less than a threshold amount of change). Based on the current ROT being stable (e.g., change in the ROT from the previous ROI is stable), the one or more processors may output the ROI (90).

Figure 7:
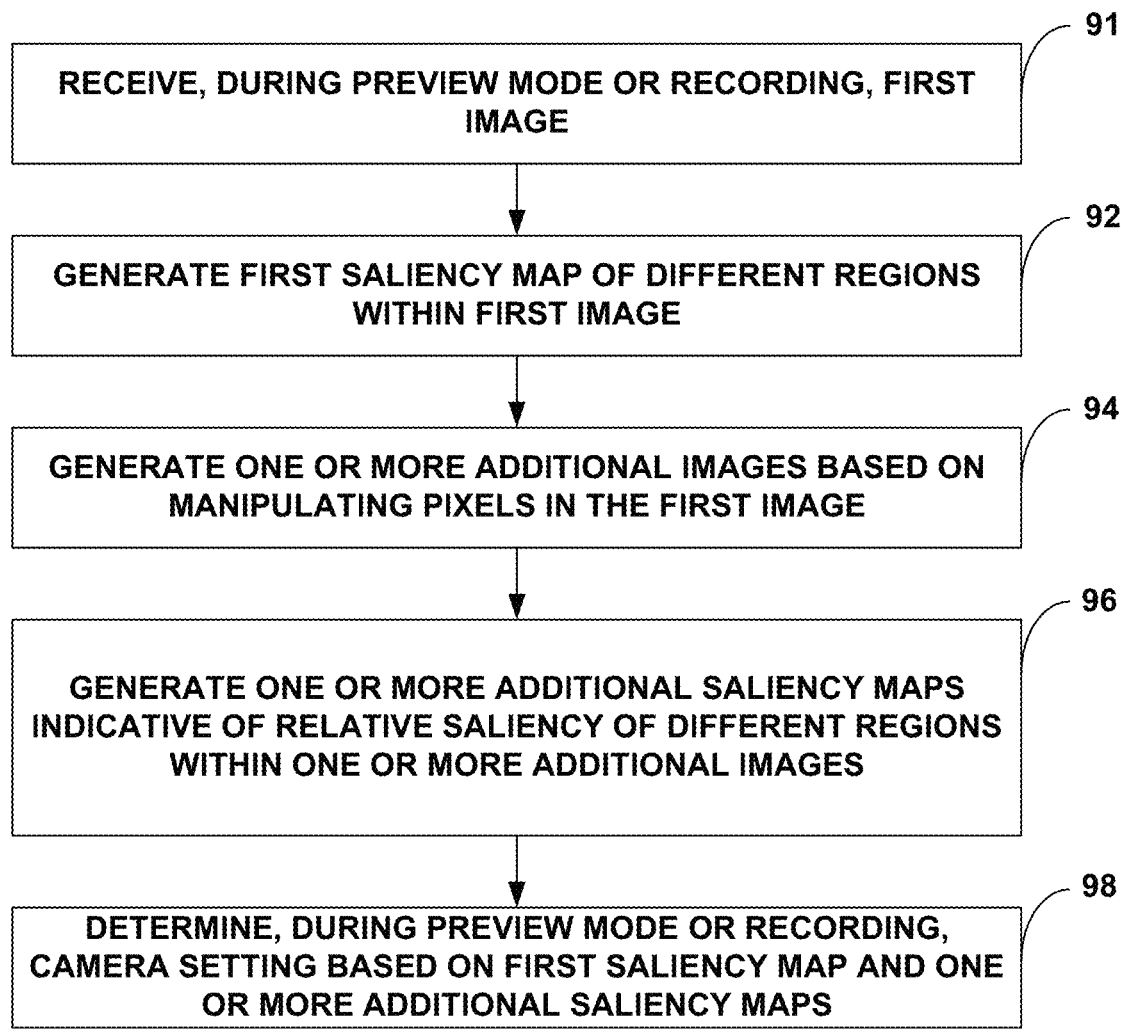
FIG. 7 is a flowchart illustrating another example method of operation in accordance with one or more examples described in this disclosure.

FIG. 7 is a flowchart illustrating another example method of operation in accordance with one or more examples described in this disclosure. Similar to FIG. 4, the example techniques of FIG. 7 are described with respect to one or more processors, examples of which include camera processor 14, CPU 16, GPU 18, display interface 26, or some other processor (e.g., vector processor).

The one or more processors may receive, during a preview mode or a recording, a first image (91). In some examples, the first image may be with lens 34 at a first lens position. Similar to FIG. 4, the one or more processors may generate a first saliency map 46 of different regions within the first image (92). The relative saliency of the different regions is indicative of a likelihood of attracting viewer gaze.

In the example of FIG. 7, the one or more processors may generate one or more additional images based on manipulating pixels in the first image (94). For instance, the one or more processors may utilize pixel manipulation unit 49 to generate the one or more additional images. The one or more additional images may be stored in system memory 30.

As one example, to generate the one or more additional images, the one or more processors may generate the one or more additional images based on depth of image content in the first image. For example, the one or more processors may generate the one or more additional images based on manipulating pixels of objects in the foreground of the first image. The one or more processors may utilize PDAF techniques described above to determine relative depths of objects, and identify objects in the foreground based on the relative depths.

In some examples, the one or more processors may perform inpainting of the first image to generate the one or more additional images. The one or more processors may be configured to perform multi-layer peeling to generate the one or more additional images. For example, the one or more additional images may include a first additional image and a second additional image. To generate one or more additional images based on manipulating pixels in the first image, the one or more processors may be configured to manipulate pixels of the first image to generate the first additional image, and manipulate pixels of the first additional image to generate the second additional image.

As another example, the one or more processors may generate the one or more additional images by simulating different exposures on the first image by changing tone of the first image. There may be other ways in which to generate the one or more additional images, and the above are a few examples.

The one or more processors may generate one or more additional saliency maps 47 indicative of relative saliency of different regions within the one or more additional images (96). For example, the one or more processors may utilize CNN application 44 to generate an additional saliency map for each of the additional images.

The one or more processors may determine, during the preview mode or the recording, a camera setting based on the first saliency map 46 and the one or more additional saliency maps 47 (98). As one example, the one or more processors may determine whether to adjust an autofocus setting (e.g., one example of a camera setting) based on first saliency map 46 and one or more additional saliency maps 47. As another example, the one or more processors may determine whether to adjust an autoexposure setting (e.g., another example of a camera setting) based on first saliency map 46 and one or more additional saliency maps 47.

As an example, as described above, the first image is generated with lens 34 of camera 12 at a first lens position, and to determine the camera setting, the one or more processors may determine an autofocus setting that defines a second lens position for lens 34. As one example, the one or more processors are configured to determine that the second lens position and the first lens position is the same, and avoid adjustment of a lens position of lens 34. As another example, the one or more processors may determine that the second lens position and the first lens position is different, and adjust a lens position of the lens to the second lens position.

As another example to determine a camera setting, the one or more processors may be configured to simulate different exposures on the first image by changing tone of the first image to generate the one or more additional images. The one or more processors may generate the one or more additional saliency maps within the one or more additional images that are generated by simulating different exposures on the first image. The one or more processors may generate a plurality of metering maps based on the first saliency map and the one or more additional saliency maps, and determine an updated metering map based on the plurality of metering maps. In such example, the one or more processors may determine the camera setting by determining an autoexposure setting based on the updated metering map.

For comparison of saliency map 46 and one or more additional saliency maps 47, in some examples, the one or more processors may compare the first saliency map 46 and the one or more additional saliency maps 47, and determine the autofocus setting based on the comparison. Examples of comparing the first saliency map 46 to the one or more additional saliency maps 47 include one or more of performing a cross correlation, a sum of absolute difference process, or a mean square error process.

As one example, such as for multi-layer peeling, the one or more processors may determine which of the one or more additional saliency maps 47 is not substantially the same as the first saliency map 46. The one or more processors may determine that regions in the one of additional saliency maps 47 that are not substantially the same as the first saliency map 46 are not at depths where the autofocus should be focused (e.g., are not at the most salient depth). That is, the one or more processors may determine a most salient depth (e.g., the depth before the depth at which one of one or more additional saliency maps 47 is different that saliency map 46), and determine the camera setting based on the determined most salient depth. There may be other ways in which to compare the first saliency map 46 to the one or more additional saliency maps 47.

Figure 8:
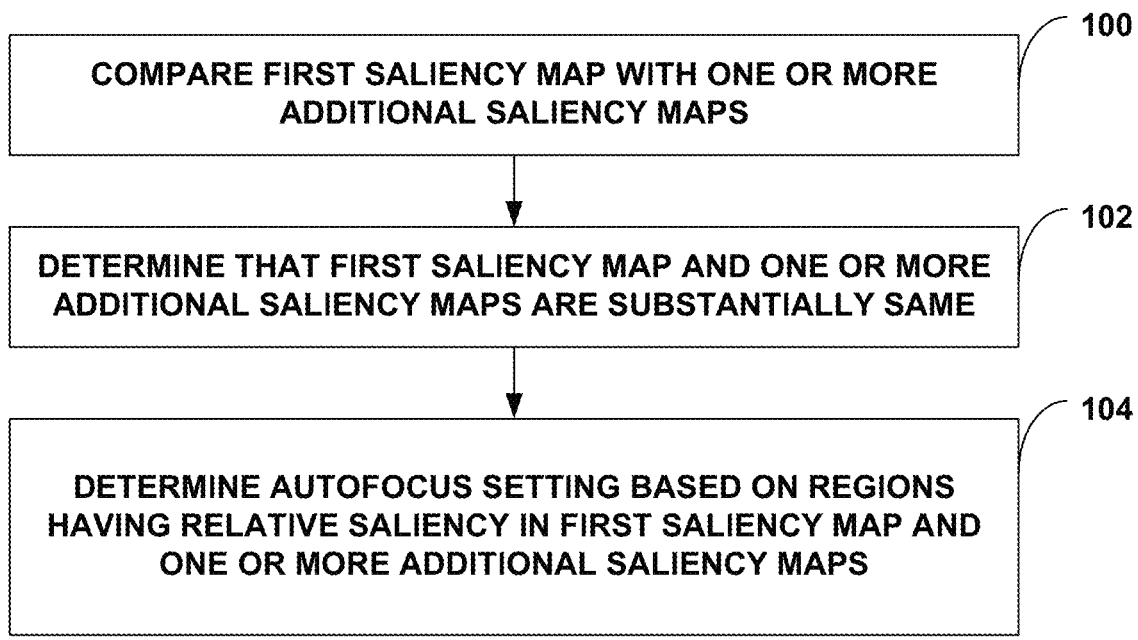
FIG. 8 is a flowchart illustrating another example method of operation in accordance with one or more examples described in this disclosure.

FIG. 8 is a flowchart illustrating another example method of operation in accordance with one or more examples described in this disclosure. For instance, FIG. 8 illustrates one example way of comparing first saliency map 46 and one or more additional saliency maps 47 for determining the autofocus setting.

The one or more processors may be configured to compare the first saliency map 46 with one or more additional saliency maps 47 (100). For instance, the one or more processors may perform a cross correlation, a sum of absolute difference process, or a mean square error process.

The one or more processors may determine that the first saliency map 46 and the one or more additional saliency maps 47 are substantially the same (102). For example, the one or more processors may determine that the cross correlation indicates that the first saliency map 46 and the one or more additional saliency maps 47 are correlated within a correlation threshold. The one or more processors may determine that the sum of absolute difference of first saliency map 46 and the one or more additional saliency maps 47 is less than a threshold. The one or more processors may determine that the mean square error between first saliency map 46 and the one or more additional saliency maps 47 is less than a threshold.

In such examples, the one or more processors may determine the autofocus setting based on regions having relative saliency in the first saliency map 46 and the one or more additional saliency maps 47 (104). For instance, the regions in the first image determined to be salient may be at the depth at which the autofocus setting should be determined if the first saliency map 46 and the one or more additional saliency maps 47 are the same.

Figure 9:
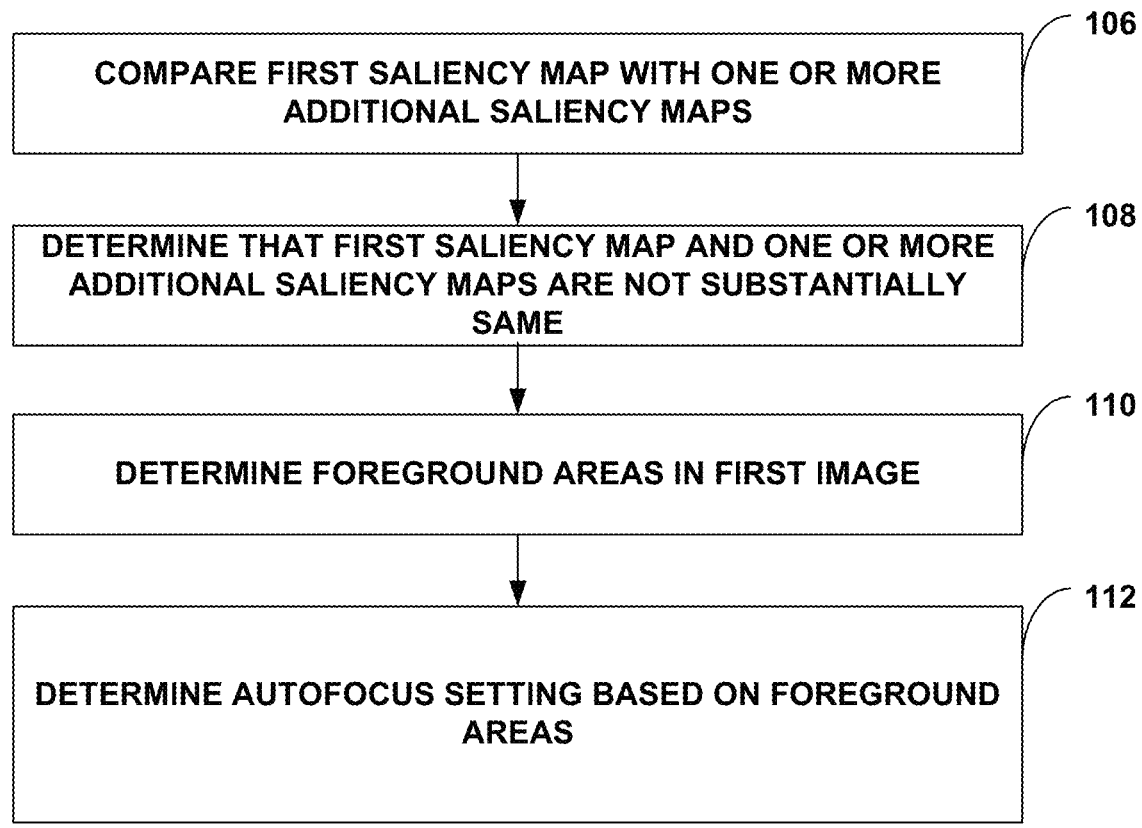
FIG. 9 is a flowchart illustrating another example method of operation in accordance with one or more examples described in this disclosure.

FIG. 9 is a flowchart illustrating another example method of operation in accordance with one or more examples described in this disclosure. For instance, FIG. 9 illustrates another example way of comparing first saliency map 46 and one or more additional saliency maps 47 for determining the autofocus setting.

Similar to FIG. 8, the one or more processors may be configured to compare the first saliency map 46 with one or more additional saliency maps 47 (106). For instance, the one or more processors may perform a cross correlation, a sum of absolute difference process, or a mean square error process.

In FIG. 9, the one or more processors may determine that the first saliency map 46 and the one or more additional saliency maps 47 are not substantially the same (108). For example, the one or more processors may determine that the cross correlation indicates that the first saliency map 46 and the one or more additional saliency maps 47 are not correlated within a correlation threshold. The one or more processors may determine that the sum of absolute difference of first saliency map 46 and the one or more additional saliency maps 47 is not less than a threshold. The one or more processors may determine that the mean square error between first saliency map 46 and the one or more additional saliency maps 47 is not less than a threshold.

In this example, because first saliency map 46 is not substantially the same as the one or more additional saliency maps 47, there may be a possibility that the salient regions determined in first saliency map 46 is not where the depth at which the autofocus setting should be determined (e.g., not the most salient depth). In such examples, the one or more processors may not determine the autofocus setting to a region determined to be salient in the first saliency map 46.

Rather, the one or more processors may determine foreground areas in the first image (110). As one example, the one or more processors may utilize disparity between two images capturing the same image content for PDAF to determine relative depths. From the relative depths, the one or more processors may determine which objects are in the foreground. The one or more processors may determine the autofocus setting based on the foreground areas (112).

Figures 10A, 10B:
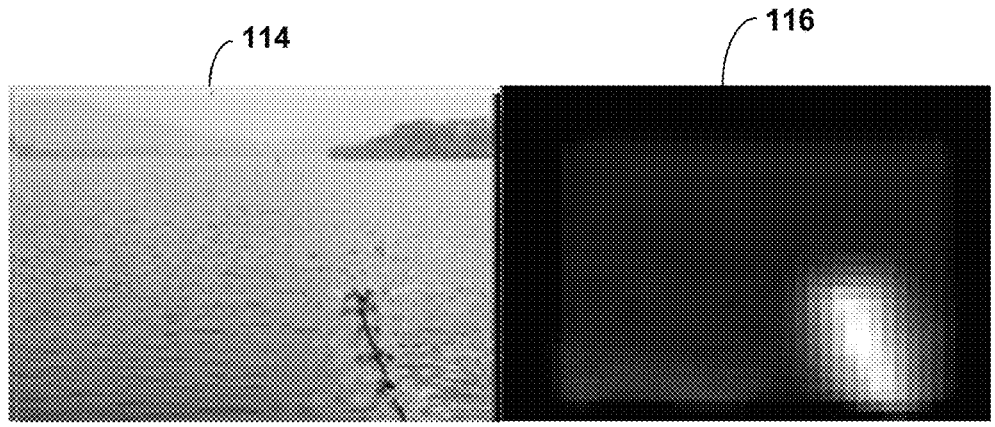
FIGS. 10A-10E are diagrams illustrating examples of generating and utilizing a saliency map.

FIGS. 10A-10E are diagrams illustrating examples of generating and utilizing a saliency map. FIG. 10A illustrates an example of input image 114 for which CNN application 44 may determine a saliency map, such as saliency map 116 illustrated in FIG. 10B. In some examples, CNN application 44 may downscale (or received a downscaled version) of image 114, where the downscaled image has size of N×M (e.g., 128×96). CNN application 44 may output saliency map 116. In some examples, the size of saliency map 116 is smaller (e.g., 32×24). For ease of illustration, FIG. 10B is illustrated with saliency map 116 being the same size as image 114.

As illustrated, in FIG. 10A, in image 114, there is a flower in a foreground and lake and mountains in the background. The flower in image 114 tends to attract the viewer's gaze more than other regions in image 114. In FIG. 10B, saliency map 116 includes samples having values that range from 0 to 255. For example, saliency map 116 may be considered as a luminance map, where dark samples (e.g., samples with values closer to 0) represent regions in image 114 with low probability of attracting viewer gaze and where bright samples (e.g., samples with values closer to 255) represent regions in image 114 with high probability of attracting viewer gaze. As can be seen in saliency map 116, the bright samples in saliency map 116 congregate around the region in image 114 that includes the flower.

Figures 10C, 10D:
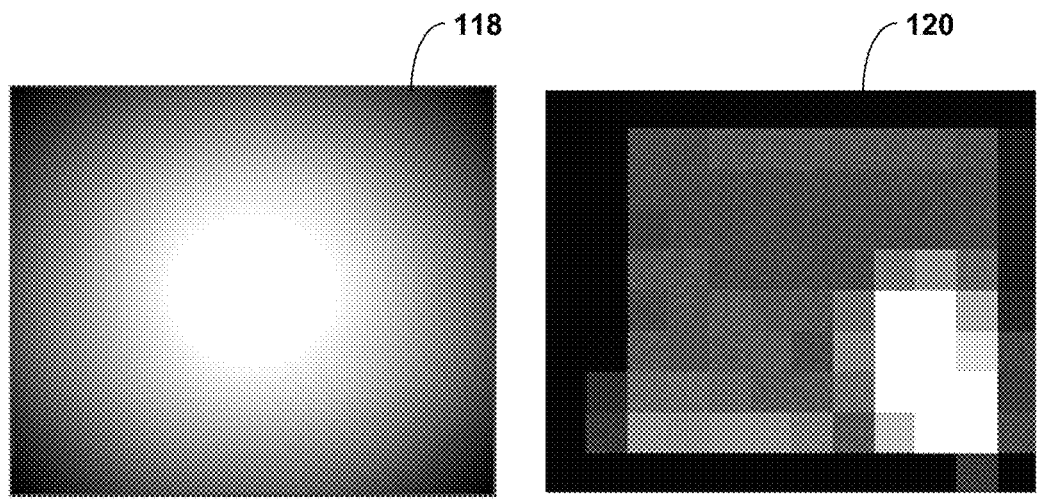

FIGS. 10C and 10D illustrate examples for updating a metering map based on a saliency map. For example, FIG. 10D illustrates metering map 118 that is center biased, such that exposure is biased towards center regions of image 114. Metering map 118 may be considered as a luminance map, where bright samples (e.g., values close to 255) in metering map 118 are where there will higher metering weight for proper exposure, and where dark samples (e.g., values close to 0) in metering map 118 are where there will be less weighting by the metering map. In one or more examples, autoexposure application 38 may determine scaling weights based on saliency values of saliency map 116, such as using line 50 of FIG. 3 (or possibly in a look-up table). Autoexposure application 38 may multiply the scaling weights with values in metering map 118 to update metering map 118 and generate metering map 120. As can be seen in metering map 120, exposure will be increased in regions of image 114 that correspond to more salient regions of image 114 (e.g., where the flower is in image 114).

Figure 10E:
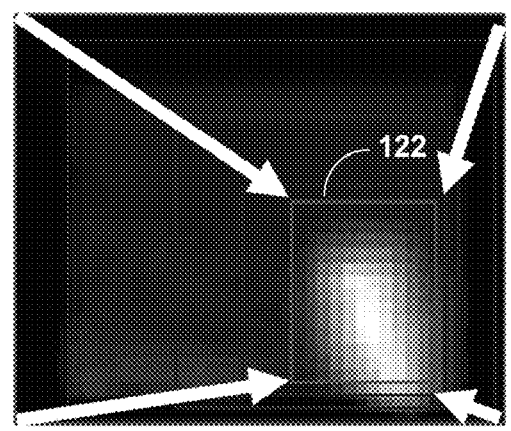

FIG. 10E illustrates an example of controlling the autofocus. As one example, autofocus application 40 may determine a region in image 114 having relatively higher saliency than one or more other regions of image 114 based on saliency map 116. For instance, FIG. 10E illustrates region 122 where the saliency is relatively higher than other regions. In some examples, autofocus application 40 may determine where aggregate value of samples in an area of saliency map 116 is greater than or equal to a threshold value. For example, in the example of FIG. 10E, the aggregate values of saliency map 116 in region 122 is approximately 50% of the total aggregate values of saliency map 116. In one or more examples, autofocus application 40 may adjust lens 34 to focus on the region in image 114 that corresponds to region 122 in saliency map 116. As can be seen, the autofocus will focus on the flower in image 114.

FIG. 11 is a flow diagram illustrating an example of utilizing multiple saliency maps for autofocus. In the example of FIG. 11, first image 130 may be an example of the image captured as part of preview or recording. The one or more processors may generate saliency map 132 for first image 130. Saliency map 132 is an example of saliency map 46 of FIG. 2.

Image 134 is a conceptual image showing areas having different relative depths. For instance, the darker colored pixels in image 134 represent pixels of objects that are more in the foreground. As shown, the fence is in front of the flower pot, and therefore in darker pixels.

Image 136 is the result of inpainting the pixels of objects in the foreground of image 130. For instance, in image 136, the fence is inpainted. Image 136 is an example of an additional image generated from first image 130. The one or more processors may generate additional saliency map 138. Additional saliency map 138 is an example of one or more additional saliency maps 47.

The one or more processors may determine whether saliency map 132 and saliency map 138 are substantially the same. In the example of FIG. 11, the one or more processors may determine that saliency map 132 and saliency map 138 are substantially the same. Therefore, the one or more processors may confirm that the pixels for objects in the foreground truly are not salient. For instance, because the fence is in the foreground, and after the fence is inpainted (e.g., manipulated), saliency map 132 and saliency map 138 remained the same; therefore, the fence may not be considered to be salient. If the fence were salient, then saliency map 132 and saliency map 138 would have been different. In this example, the one or more processors may determine the autofocus setting to be further back from the fence, and in accordance with saliency regions in saliency map 132 or saliency map 138.

Figure 12:
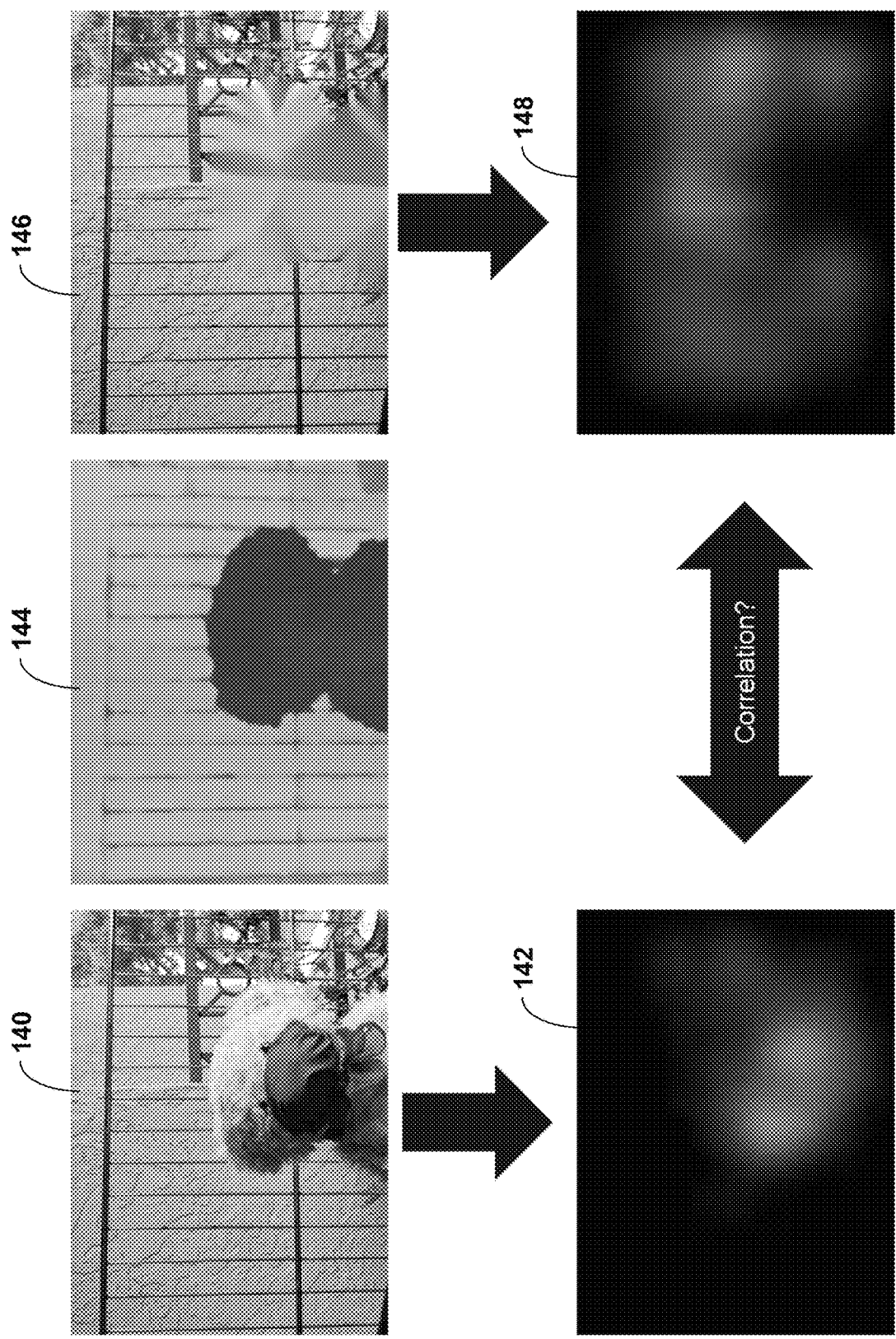
FIG. 12 is a flow diagram illustrating an additional example of utilizing multiple saliency maps for autofocus.

FIG. 12 is a flow diagram illustrating an additional example of utilizing multiple saliency maps for autofocus. In the example of FIG. 12, first image 140 may be an example of the image captured as part of preview or recording. The one or more processors may generate saliency map 142 for first image 140. Saliency map 142 is an example of saliency map 46 of FIG. 2.

Image 144 is a conceptual image showing areas having different relative depths. For instance, the darker colored pixels in image 144 represent pixels of objects that are more in the foreground. As shown, the teddy bear is in front of the fence, and therefore in darker pixels. The fence is in front of the wall, and therefore in darker pixels than the wall, but lighter pixels than the teddy bear.

Image 146 is the result of inpainting the pixels of objects in the foreground of image 140. For instance, in image 146, the teddy bear is inpainted. Image 146 is an example of an additional image generated from first image 140. The one or more processors may generate additional saliency map 148. Additional saliency map 148 is an example of one or more additional saliency maps 47.

The one or more processors may determine whether saliency map 142 and saliency map 148 are substantially the same. In the example of FIG. 12, the one or more processors may determine that saliency map 142 and saliency map 148 are not substantially the same. Therefore, the one or more processors may confirm there are portions in the foreground that are salient. For instance, if saliency map 142 and saliency map 148 were the same, then the pixels for the objects in the foreground may not be that salient. However, because saliency map 142 and saliency map 148 are different, then the objects in the foreground (e.g., that were inpainted) may be salient. Accordingly, the one or more processors may determine the autofocus setting based on the depth of salient regions from saliency map 142, and adjust the autofocus to the foreground region.

The following describes one or more example techniques in accordance with this disclosure.

Clause 1A. A device for capture or image processing, the device comprising: memory; and one or more processors coupled to the memory and configured to: receive an image in preview mode or for recording; generate, in real-time during the preview mode or the recording, a saliency map indicative of relative saliency of different regions within the image in attracting viewer gaze; and process the image based on the saliency map.

Clause 2A. The device of clause 1B, wherein the saliency map is indicative of probabilities that the different regions within the image attract viewer gaze, and wherein the probabilities are indicative of the relative saliency.

Clause 3A. The device of any of clauses 1A and 2A, wherein generating the saliency map comprises utilizing weights, stored in the memory, generated by one or more machine-learning models to process sample values from the image to identify areas in the image having higher probabilities of attracting viewer gaze differently than areas in the image having lower probabilities of attracting viewer gaze.

Clause 4A. The device of clause 3A, wherein the weights generated by the one or more machine learning models are generated from saliency points, on a plurality of training images, identified based on eye tracking of one or more viewers viewing the training images.

Clause 5A. The device of any of clauses 1A-4A, wherein processing the image comprises one or more of: adjusting a white balance of the device configured to capture the image; adjusting a focus of the device configured to capture the image; or adjusting an exposure of the device configured to capture the image.

Clause 6A. The device of any of clauses 1A-5A, wherein processing the image comprises one or more of: determining quantization levels for encoding the image; zooming or cropping the image; or increasing an amount of processing performed on regions having relatively higher saliency as compared to other regions.

Clause 7A. The device of any of clauses 1A-6A, wherein the one or more processors are configured to: determine a region of interest in the image, and wherein generating the saliency map comprises determining the saliency map within the determined region of interest.

Clause 8A. The device of any of clauses 1A-7A, wherein the one or more processors are configured to scale a metering map for autoexposure based on the saliency map to generate an updated metering map, wherein processing the image comprises adjusting exposure of the image based on the updated metering map.

Clause 9A. The device of any of clauses 1A-8A, wherein the one or more processors are configured to determine a region in the image having relatively higher saliency than one or more other regions of the image based on the saliency map, wherein processing the image comprises adjusting focus based on the determined region.

Clause 10A. The device of any of clauses 1A-9A, wherein generating the saliency map comprises: downscaling the image to generate a N×M sized downscaled image; and generating the saliency map based on the downscaled image, wherein a size of the saliency map is X×Y, and wherein at least one of X is less than N or Y is less than M.

Clause 11A. The device of any of clauses 1A-10A, wherein the device is one or more of a digital camera, digital video camcorder, or a camera-equipped wireless communication device handset.

Clause 12A. A method for capture or image processing, the method comprising: receiving, with one or more processors, an image in preview mode or for recording; generating, with the one or more processors, in real-time during the preview mode or the recording, a saliency map indicative of relative saliency of different regions within the image in attracting viewer gaze, and processing, with the one or more processors, the image based on the saliency map.

Clause 13A. The method of clause 12A, wherein the saliency map is indicative of probabilities that the different regions within the image attract viewer gaze, and wherein the probabilities are indicative of the relative saliency.

Clause 14A. The method of any of clauses 12A and 13A, wherein generating the saliency map comprises utilizing weights, stored in memory, generated by one or more machine-learning models to process sample values from the image to identify areas in the image having higher probabilities of attracting viewer gaze differently than areas in the image having lower probabilities of attracting viewer gaze.

Clause 15A. The method of clause 14A, wherein the weights generated by the one or more machine learning models are generated from saliency points, on a plurality of training images, identified based on eye tracking of one or more viewers viewing the training images.

Clause 16A. The method of any of clauses 12A-15A, wherein processing the image comprises one or more of: adjusting a white balance of a device configured to capture the image; adjusting a focus of the device configured to capture the image; or adjusting an exposure of the device configured to capture the image.

Clause 17A. The method of any of clauses 12A-16A, wherein processing the image comprises one or more of: determining quantization levels for encoding the image; zooming or cropping the image; or increasing an amount of processing performed on regions having relatively higher saliency as compared to other regions.

Clause 18A. The method of any of clauses 12A-17A, further comprising: determining a region of interest in the image, and wherein generating the saliency map comprises determining the saliency map within the determined region of interest.

Clause 19A. The method of any of clauses 12A-18A, further comprising scaling a metering map for autoexposure based on the saliency map to generate an updated metering map, wherein processing the image comprises adjusting exposure of the image based on the updated metering map.

Clause 20A. The method of any of clauses 12A-19A, further comprising determining a region in the image having relatively higher saliency than one or more other regions of the image based on the saliency map, wherein processing the image comprises adjusting focus based on the determined region.

Clause 21A. The method of any of clauses 12A-20A, wherein generating the saliency map comprises: downscaling the image to generate a N×M sized downscaled image; and generating the saliency map based on the downscaled image, wherein a size of the saliency map is X×Y, and wherein at least one of X is less than N or Y is less than M.

Clause 22A. The method of any of clauses 12A-21A, wherein the one or more processors are of a device comprising one or more of a digital camera, digital video camcorder, or a camera-equipped wireless communication device handset.

Clause 23A. A computer-readable storage medium having instructions stored thereon that when executed cause one or more processors to: receive an image in preview mode or for recording; generate, in real-time during the preview mode or the recording, a saliency map indicative of relative saliency of different regions within the image in attracting viewer gaze; and process the image based on the saliency map.

Clause 24A. The computer-readable storage medium of clause 23A, wherein the saliency map is indicative of probabilities that the different regions within the image attract viewer gaze, and wherein the probabilities are indicative of the relative saliency.

Clause 25A. The computer-readable storage medium of any of clauses 23A and 24A, wherein the instructions that cause the one or more processors to generate the saliency map comprise instructions that cause the one or more processors to utilize weights generated by one or more machine-learning models to process sample values from the image to identify areas in the image having higher probabilities of attracting viewer gaze differently than areas in the image having lower probabilities of attracting viewer gaze.

Clause 26A. The computer-readable storage medium of any of clauses 23A-25A, wherein the instructions that cause the one or more processors to process the image comprise instructions that cause the one or more processors to one or more of: adjust a white balance of the device configured to capture the image; adjust a focus of the device configured to capture the image; or adjust an exposure of the device configured to capture the image.

Clause 27A. The computer-readable storage medium of any of clauses 23A-26A, wherein the instructions that cause the one or more processors to process the image comprise instructions that cause the one or more processors to one or more of: determine quantization levels for encoding the image; zoom or crop the image; or increase an amount of processing performed on regions having relatively higher saliency as compared to other regions.

Clause 28A. A device for capture or image processing, the device comprising: means for receiving an image in preview mode or for recording; means for generating in real-time during the preview mode or the recording, a saliency map indicative of relative saliency of different regions within the image in attracting viewer gaze; and means for processing the image based on the saliency map.

Clause 29A. The device of clause 28A, wherein the saliency map is indicative of probabilities that the different regions within the image attract viewer gaze, and wherein the probabilities are indicative of the relative saliency.

Clause 30A. The device of any of clauses 28A and 29A, wherein the means for generating the saliency map comprises means for utilizing weights, stored in memory, generated by one or more machine-learning models to process sample values from the image to identify areas in the image having higher probabilities of attracting viewer gaze differently than areas in the image having lower probabilities of attracting viewer gaze.

Clause 1B. A device for image capture, the device comprising a memory; and one or more processors coupled to the memory and configured to: receive, during a preview mode or a recording, a first image; generate a first saliency map indicative of relative saliency of different regions within the first image, wherein the relative saliency of the different regions is indicative of a likelihood of attracting viewer gaze; generate one or more additional images based on manipulating pixels in the first image; generate one or more additional saliency maps indicative of relative saliency of different regions within the one or more additional images; and determine, during the preview mode or the recording, a camera setting based on the first saliency map and the one or more additional saliency maps.

Clause 2B. The device of clause 1B, wherein the first image is generated with a lens of a camera at a first lens position, and wherein determining the camera setting comprises determining an autofocus setting that defines a second lens position for the lens.

Clause 3B. The device of clause 2B, wherein the one or more processors are configured to determine that the second lens position and the first lens position is the same; and avoid adjustment of a lens position of the lens.

Clause 4B. The device of clause 2B, wherein the one or more processors are configured to: determine that the second lens position and the first lens position is different; and adjust a lens position of the lens to the second lens position.

Clause 5B. The device of any of clauses 1B-4B, wherein generating the one or more additional images based on manipulating pixels in the first image comprises generating the one or more additional images based on depth of image content in the first image.

Clause 6B. The device of any of clauses 1B-5B, wherein generating the one or more additional images comprises generating the one or more additional images based on manipulating pixels of objects in a foreground of the first image.

Clause 7B. The device of any of clauses 1B-6B, wherein determining the camera setting based on the first saliency map and the one or more additional saliency maps comprises: comparing the first saliency map to the one or more additional saliency maps; and determining the camera setting based on the comparison.

Clause 8B. The device of clause 7B, wherein comparing the first saliency map to the one or more additional saliency maps comprises one or more of performing a cross correlation, a sum of absolute difference process, or a mean square error process.

Clause 9B. The device of any of clauses 1B-8B, wherein determining the camera setting based on the first saliency map and the one or more additional saliency maps comprises: comparing the first saliency map with the one or more additional saliency maps; determining that the first saliency map and the one or more additional saliency maps are substantially the same; and determining an autofocus setting based on regions having relative saliency in the first saliency map and the one or more additional saliency maps.

Clause 10B. The device of any of clauses 1B-8B, wherein determining the camera setting based on the first saliency map and the one or more additional saliency maps comprises: comparing the first saliency map with the one or more additional saliency maps; determining that the first saliency map and the one or more additional saliency maps are not substantially the same; determining foreground areas in the first image; and determining an autofocus setting based on the foreground areas.

Clause 11B. The device of any of clauses 1B-10B, wherein the one or more additional images comprises a first additional image and a second additional image, and wherein generating one or more additional images based on manipulating pixels in the first image comprises: manipulating pixels of the first image to generate the first additional image, and manipulating pixels of the first additional image to generate the second additional image.

Clause 12B. The device of any of clauses 1B-11B, wherein generating one or more additional images comprises: inpainting the first image to generate the one or more additional images.

Clause 13B. The device of any of clauses 1B-12B, wherein generating the saliency map comprises: downscaling the image to generate a N×M sized downscaled image; and generating the saliency map based on the downscaled image, wherein a size of the saliency map is X×Y, and wherein at least one of X is less than N or Y is less than M.

Clause 14B. The device of any of clauses 1B, 5B, 6B, 11B, and 13B, wherein generating the one or more additional images comprises simulating different exposures on the first image by changing tone of the first image to generate the one or more additional images, wherein generating the one or more additional saliency maps comprises generating the one or more additional saliency maps within the one or more additional images that are generated by simulating different exposures on the first image, wherein the one or more processors are configured to generate a plurality of metering maps based on the first saliency map and the one or more additional saliency maps, and determine an updated metering map based on the plurality of metering maps, and wherein determining the camera setting comprises determining an autoexposure setting based on the updated metering map.

Clause 15B. The device of any of clauses 1B-14B, wherein determining the camera setting comprises: determining a most salient depth based on the first saliency map and the one or more additional saliency maps; and determining the camera setting based on the determined most salient depth.

Clause 16B. The device of any of clauses 1B-15B, wherein the device is one or more of a digital camera, a digital video camcorder, or a camera-equipped wireless communication device handset.

Clause 17B. A method for image capture, the method comprising: receiving, during a preview mode or a recording, a first image; generating a first saliency map indicative of relative saliency of different regions within the first image, wherein the relative saliency of the different regions is indicative of a likelihood of attracting viewer gaze; generating one or more additional images based on manipulating pixels in the first image; generating one or more additional saliency maps indicative of relative saliency of different regions within the one or more additional images; and determining, during the preview mode or the recording, a camera setting based on the first saliency map and the one or more additional saliency maps.

Clause 18B. The method of clause 17B, wherein the first image is generated with a lens of a camera at a first lens position, and wherein determining the camera setting comprises determining an autofocus setting that defines a second lens position for the lens.

Clause 19B. The method of clause 18B, further comprising: determining that the second lens position and the first lens position is the same; and avoiding adjustment of a lens position of the lens.

Clause 20B. The method of clause 18B, further comprising: determining that the second lens position and the first lens position is different; and adjusting a lens position of the lens to the second lens position.

Clause 21B. The method of any of clauses 17B-20B, wherein generating the one or more additional images based on manipulating pixels in the first image comprises generating the one or more additional images based on depth of image content in the first image.

Clause 22B. The method of any of clauses 17B-21B, wherein generating the one or more additional images comprises generating the one or more additional images based on manipulating pixels of objects in a foreground of the first image.

Clause 23B. The method of any of clauses 17B-22B, wherein determining the camera setting based on the first saliency map and the one or more additional saliency maps comprises: comparing the first saliency map to the one or more additional saliency maps; and determining the camera setting based on the comparison.

Clause 24B. The method of clause 23B, wherein comparing the first saliency map to the one or more additional saliency maps comprises one or more of performing a cross correlation, a sum of absolute difference process, or a mean square error process.

Clause 25B. The method of any of clauses 17B-24B, wherein determining the camera setting based on the first saliency map and the one or more additional saliency maps comprises: comparing the first saliency map with the one or more additional saliency maps; determining that the first saliency map and the one or more additional saliency maps are substantially the same; and determining an autofocus setting based on regions having relative saliency in the first saliency map and the one or more additional saliency maps.

Clause 26B. The method of any of clauses 17B-24B, wherein determining the camera setting based on the first saliency map and the one or more additional saliency maps comprises: comparing the first saliency map with the one or more additional saliency maps; determining that the first saliency map and the one or more additional saliency maps are not substantially the same; determining foreground areas in the first image; and determining an autofocus setting based on the foreground areas.

Clause 27B. The method of any of clauses 17B, 21B, and 22B, wherein generating the one or more additional images comprises simulating different exposures on the first image by changing tone of the first image to generate the one or more additional images, wherein generating the one or more additional saliency maps comprises generating the one or more additional saliency maps within the one or more additional images that are generated by simulating different exposures on the first image, the method further comprising generating a plurality of metering maps based on the first saliency map and the one or more additional saliency maps, and determining an updated metering map based on the plurality of metering maps, wherein determining the camera setting comprises determining an autoexposure setting based on the updated metering map.

Clause 28B. The method of any of clauses 17B-27B, wherein generating one or more additional images comprises: inpainting the first image to generate the one or more additional images.

Clause 29B. The method of any of clauses 17B-28B, wherein determining the camera setting comprises: determining a most salient depth based on the first saliency map and the one or more additional saliency maps; and determining the camera setting based on the determined most salient depth.

Clause 30B. A computer-readable storage medium storing instructions thereon that when executed cause one or more processors to: receive, during a preview mode or a recording, a first image; generate a first saliency map indicative of relative saliency of different regions within the first image, wherein the relative saliency of the different regions is indicative of a likelihood of attracting viewer gaze; generate one or more additional images based on manipulating pixels in the first image; generate one or more additional saliency maps indicative of relative saliency of different regions within the one or more additional images; and determine, during the preview mode or the recording, a camera setting based on the first saliency map and the one or more additional saliency maps.

Clause 31B. The computer-readable storage medium storing instructions thereon that when executed cause one or more processors to perform the method of any of clauses 17B-29B.

Clause 32B. A device for image capture, the device comprises means for receiving, during a preview mode or a recording, a first image; means for generating a first saliency map indicative of relative saliency of different regions within the first image, wherein the relative saliency of the different regions is indicative of a likelihood of attracting viewer gaze; means for generating one or more additional images based on manipulating pixels in the first image; means for generating one or more additional saliency maps indicative of relative saliency of different regions within the one or more additional images; and means for determining, during the preview mode or the recording, a camera setting based on the first saliency map and the one or more additional saliency maps.

Clause 33B. The device of clause 32B, further comprising means for performing the method of any of clauses 17B-29B.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for image capture, the device comprising:
   a memory; and
   one or more processors coupled to the memory and configured to:
      receive, during a preview mode or a recording, a first image generated with a lens of a camera at a first lens position;
      generate a first saliency map indicative of relative saliency of different regions within the first image, wherein the relative saliency of the different regions is indicative of a likelihood of attracting viewer gaze;
      generate one or more additional images based on manipulating pixels in the first image;
      generate one or more additional saliency maps indicative of relative saliency of different regions within the one or more additional images;
      determine, during the preview mode or the recording, an autofocus setting that defines a second lens position for the lens based on a comparison of at least the first saliency map to at least one of the additional saliency maps;
      determine that the second lens position and the first lens position is different; and
      adjust a lens position of the lens to the second lens position.

2. The device of claim 1, wherein the one or more additional images comprise a first set of one or more additional images, wherein the one or more additional saliency maps comprise a first set of one or more additional saliency maps, wherein the autofocus setting comprises a first autofocus setting, wherein the preview mode or the recording comprises a first preview mode or recording, and wherein the one or more processors are configured to:
   receive, during a second preview mode or recording, a second image generated with the lens of the camera at a third lens position;
   generate a second saliency map indicative of relative saliency of different regions within the second image;
   generate a second set of one or more additional images based on manipulating pixels in the second image;
   generate a second set of one or more additional saliency maps indicative of relative saliency of different regions within the second set of one or more additional images;
   determine, during the second preview mode or recording, a second autofocus setting that defines a fourth lens position for the lens based on a comparison of at least the second saliency map to at least one of the second set of one or more additional saliency maps;
   determine that the fourth lens position and the third lens position is the same; and
   avoid adjustment of a lens position of the lens.

3. The device of claim 1, wherein generating the one or more additional images based on manipulating pixels in the first image comprises generating the one or more additional images based on depth of image content in the first image.

4. The device of claim 1, wherein generating the one or more additional images comprises generating the one or more additional images based on manipulating pixels of objects in a foreground of the first image.

5. The device of claim 1, wherein comparing the first saliency map to the one or more additional saliency maps comprises one or more of performing a cross correlation, a sum of absolute difference process, or a mean square error process.

6. The device of claim 1, wherein determining the autofocus setting that defines the second lens position for the lens based on the comparison of at least the first saliency map to at least one of the additional saliency maps comprises:
   determining that the first saliency map and the one or more additional saliency maps are substantially the same; and
   determining the autofocus setting based on regions having relative saliency in the first saliency map and the one or more additional saliency maps.

7. The device of claim 1, wherein determining the autofocus setting that defines the second lens position for the lens based on the comparison of at least the first saliency map to at least one of the additional saliency maps comprises:
    determining that the first saliency map and the one or more additional saliency maps are not substantially the same;
    determining foreground areas in the first image; and
    determining an autofocus setting based on the foreground areas.

8. The device of claim 1, wherein the one or more additional images comprises a first additional image and a second additional image, and wherein generating one or more additional images based on manipulating pixels in the first image comprises:
    manipulating pixels of the first image to generate the first additional image; and
    manipulating pixels of the first additional image to generate the second additional image.

9. The device of claim 1, wherein generating the one or more additional images comprises inpainting the first image to generate the one or more additional images.

10. The device of claim 1, wherein generating the first saliency map comprises:
    downscaling the first image to generate a N×M sized downscaled image; and
    generating the first saliency map based on the downscaled image,
    wherein a size of the first saliency map is X×Y, and
    wherein at least one of X is less than N or Y is less than M.

11. The device of claim 1, wherein determining the autofocus setting that defines the second lens position for the lens comprises:
    determining a most salient depth based on the comparison of at least the first saliency map to at least one of the additional saliency maps; and
    determining the autofocus setting that defines the second lens position for the lens based on the determined most salient depth.

12. The device of claim 1, wherein the device is one or more of a digital camera, a digital video camcorder, or a camera-equipped wireless communication device handset.

13. The device of claim 1, wherein determining the camera setting based on the comparison of at least the first saliency map to at least one of the additional saliency maps comprises:
    determining that a difference between the first saliency map and the one or more additional saliency maps is less than a threshold; and
    determining the autofocus setting based on regions having relative saliency in the first saliency map and the one or more additional saliency maps.

14. The device of claim 13,
    wherein the one or more additional images comprise a first set of one or more additional images,
    wherein the one or more additional saliency maps comprise a first set of one or more additional saliency maps,
    wherein the camera setting is a first camera setting,
    wherein the autofocus setting a first autofocus setting, and
    wherein the one or more processors are configured to:
        receive a second image;
        generate a second saliency map indicative of relative saliency of different regions within the second image;
        generate a second set of one or more additional images based on manipulating pixels in the second image;
        generate a second set of one or more additional saliency maps indicative of relative saliency of different regions within the second set of one or more additional images; and
        determine that a difference between the second saliency map and the second set of one or more additional saliency maps is greater than the threshold; and
        determine a second autofocus setting based on foreground areas in the second image.

15. A method for image capture, the method comprising:
    receiving, during a preview mode or a recording, a first image;
    generating a first saliency map indicative of relative saliency of different regions within the first image, wherein the relative saliency of the different regions is indicative of a likelihood of attracting viewer gaze;
    generating one or more additional images based on manipulating pixels in the first image;
    generating one or more additional saliency maps indicative of relative saliency of different regions within the one or more additional images; and
    determining, during the preview mode or the recording, a camera setting based on a comparison of at least the first saliency map to at least one of the additional saliency maps wherein determining the camera setting based on the comparison of at least the first saliency map to at least one of the additional saliency maps comprises:
        determining that the first saliency map and the one or more additional saliency maps are substantially the same; and
        determining an autofocus setting based on regions having relative saliency in the first saliency map and the one or more additional saliency maps.

16. The method of claim 15, wherein the first image is generated with a lens of a camera at a first lens position, and wherein determining the autofocus setting comprises determining the autofocus setting that defines a second lens position for the lens.

17. The method of claim 16, further comprising:
    determining that the second lens position and the first lens position is the same; and
    avoiding adjustment of a lens position of the lens.

18. The method of claim 16, further comprising:
    determining that the second lens position and the first lens position is different; and
    adjusting a lens position of the lens to the second lens position.

19. The method of claim 15, wherein generating the one or more additional images based on manipulating pixels in the first image comprises generating the one or more additional images based on depth of image content in the first image.

20. The method of claim 15, wherein generating the one or more additional images comprises generating the one or more additional images based on manipulating pixels of objects in a foreground of the first image.

21. The method of claim 15, wherein comparing the first saliency map to the one or more additional saliency maps comprises one or more of performing a cross correlation, a sum of absolute difference process, or a mean square error process.

22. The method of claim 15, wherein the one or more additional images comprise a first set of one or more additional images, wherein the one or more additional saliency maps comprise a first set of one or more additional saliency maps, wherein the autofocus setting comprises a first autofocus setting, wherein the preview mode or the recording comprises a first preview mode or recording, wherein the camera setting comprises a first camera setting, the method further comprising:

receiving, during a second preview mode or recording, a second image;
generating a second saliency map indicative of relative saliency of different regions within the second image;
generating a second set of one or more additional images based on manipulating pixels in the second image;
generating a second set of one or more additional saliency maps indicative of relative saliency of different regions within the second set of one or more additional images;
determining, during the second preview mode or recording, a second autofocus setting that defines a fourth lens position for the lens based on a comparison of at least the second saliency map to at least one of the second set of one or more additional saliency maps;
determining a second camera setting based on the comparison of at least the second saliency map to at least one of the second set of one or more additional saliency maps, wherein determining the second camera setting based on the comparison of at least the second saliency map to at least one of the second set of one or more additional saliency maps comprises:
determining that the second saliency map and the second set of one or more additional saliency maps are not substantially the same;
determining foreground areas in the second image; and
determining a second autofocus setting based on the foreground areas.

23. The method of claim 15, wherein generating one or more additional images comprises inpainting the first image to generate the one or more additional images.

24. The method of claim 15, wherein determining the camera setting comprises:
determining a most salient depth based on the comparison of at least the first saliency map to at least one of the additional saliency maps; and
determining the autofocus setting comprises determining the autofocus setting based on the determined most salient depth.

25. The method of claim 15,
wherein the one or more additional images comprise a first set of one or more additional images,
wherein the one or more additional saliency maps comprise a first set of one or more additional saliency maps,
wherein the camera setting is a first camera setting, and
wherein the autofocus setting a first autofocus setting,
the method further comprising:
receiving a second image;
generating a second saliency map indicative of relative saliency of different regions within the second image;
generating a second set of one or more additional images based on manipulating pixels in the second image;
generating a second set of one or more additional saliency maps indicative of relative saliency of different regions within the second set of one or more additional images; and
determining that a difference between the second saliency map and the second set of one or more additional saliency maps is greater than a threshold; and
determining a second autofocus setting based on foreground areas in the second image.

26. A computer-readable storage medium storing instructions thereon that when executed cause one or more processors to:
receive, during a preview mode or a recording, a first image generated with a lens of a camera at a first lens position;
generate a first saliency map indicative of relative saliency of different regions within the first image, wherein the relative saliency of the different regions is indicative of a likelihood of attracting viewer gaze;
generate one or more additional images based on manipulating pixels in the first image;
generate one or more additional saliency maps indicative of relative saliency of different regions within the one or more additional images;
determine, during the preview mode or the recording, a camera setting an autofocus setting that defines a second lens position for the lens based on a comparison of at least the first saliency map to at least one of the additional saliency maps;
determine that the second lens position and the first lens position is different; and
adjust the lens position of the lens to the second lens position.

27. A device for image capture, the device comprising:
a memory; and
one or more processors coupled to the memory and configured to:
receive, during a preview mode or a recording, a first image;
generate a first saliency map indicative of relative saliency of different regions within the first image, wherein the relative saliency of the different regions is indicative of a likelihood of attracting viewer gaze;
simulate different exposures on the first image based on changing tone of the first image to generate one or more additional images;
generate one or more additional saliency maps, indicative of relative saliency of different regions within the one or more additional images, within the one or more additional images;
generate a plurality of metering maps based on the first saliency map and the one or more additional saliency maps;
determine an updated metering map based on the plurality of metering maps; and
determine, during the preview mode or the recording, an autoexposure setting based on the updated metering map.

28. A method for image capture, the method comprising:
receiving, during a preview mode or a recording, a first image;
generating a first saliency map indicative of relative saliency of different regions within the first image, wherein the relative saliency of the different regions is indicative of a likelihood of attracting viewer gaze;
simulating different exposures on the first image based on changing tone of the first image to generate one or more additional images;
generating one or more additional saliency maps, indicative of relative saliency of different regions within the one or more additional images, within the one or more additional images;
generating a plurality of metering maps based on the first saliency map and the one or more additional saliency maps;

determining an updated metering map based on the plurality of metering maps; and determining, during the preview mode or the recording, an autoexposure setting based on the updated metering map.

\* \* \* \* \*